United States Patent
Inohara et al.

(10) Patent No.: US 6,757,670 B1
(45) Date of Patent: Jun. 29, 2004

(54) METHOD AND SYSTEM FOR QUERY PROCESSING

(75) Inventors: Shigekazu Inohara, Yokohama (JP); Itaru Nishizawa, Koganei (JP); Nobutoshi Sagawa, Koganei (JP); Akira Shimizu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 581 days.

(21) Appl. No.: 09/659,616

(22) Filed: Sep. 11, 2000

(30) Foreign Application Priority Data

Sep. 13, 1999 (JP) .......................................... 11-258358

(51) Int. Cl.[7] .............................................. G06F 17/30
(52) U.S. Cl. ........................ 707/3; 707/2; 707/4; 707/5; 707/6
(58) Field of Search ................................ 707/2, 3, 4, 5, 707/103, 6, 102, 104; 345/853; 370/395.21

(56) References Cited

U.S. PATENT DOCUMENTS

| | | | | |
|---|---|---|---|---|
| 5,644,740 A | * | 7/1997 | Kiuchi | 345/853 |
| 5,734,893 A | * | 3/1998 | Li et al. | 707/3 |
| 5,852,823 A | * | 12/1998 | De Bonet | 707/6 |
| 5,899,999 A | * | 5/1999 | De Bonet | 707/104 |
| 5,907,838 A | * | 5/1999 | Miyasaka et al. | 707/4 |
| 6,006,224 A | * | 12/1999 | McComb et al. | 707/5 |
| 6,085,198 A | * | 7/2000 | Skinner et al. | 707/103 |
| 6,226,637 B1 | * | 5/2001 | Carey et al. | 707/4 |
| 6,233,586 B1 | * | 5/2001 | Chang et al. | 707/103 |
| 6,289,334 B1 | * | 9/2001 | Reiner et al. | 707/3 |
| 6,513,035 B1 | * | 1/2003 | Tanaka et al. | 707/3 |
| 6,587,466 B1 | * | 7/2003 | Bhattacharya et al. | 370/395.21 |

OTHER PUBLICATIONS

ACM SIGMOD Conference, May 1979, pp. 23–34.
Oracle 8 Server Release 8.0, Overview: vol. 2, pp. 19–17 – 19–11.
Oracle 8 Server Release 8.0 Tuning, pp.8–8 –8–27.
Oracle8™ Concepts, Release 8.0, pp.20.6 –20.11.
Oracle8™ Tuning, Release 8.0, pp.8.10 –8.35.

* cited by examiner

*Primary Examiner*—Thuy N. Pardo
(74) *Attorney, Agent, or Firm*—Antonelli, Terry, Stout & Kraus, LLP

(57) ABSTRACT

Method and apparatus for query processing including an optimization controller, responding to a query from an application related to an database, and controlling optimization processing of the query. A query classification definition and a query operation direction associated with the query classification definition are defined on a storing means. The query classification definition classifies the queries according to classifications and attributes including environment for use, time for use, database to be accessed, and the amount of data that is processed. The query operation direction defines strength of the direction including "Force", "Recommended", "Neutral", and "Deny", which is used to select operation at the time of query execution from several alternatives. During optimization processing of the received query, the system controls the optimization processing according to the query control information that has been set, enabling control of DBMS operation in a batch for two or more queries without modifying the applications.

24 Claims, 9 Drawing Sheets

FIG. 3

QUERY CONTROL INFORMATION 300

| ID 301 | QUERY CLASSIFICATION DEFINITION 310 | QUERY OPERATION DIRECTION 330 |
|---|---|---|
| | | |
| | | |

QUERY CLASSIFICATION DEFINITION 310

| KEY 311 | PATTERN 312 |
|---|---|
| APPLICATION NAME 313 | |
| APPLICATION TYPE 314 | |
| USER ORGANIZATION 315 | |
| NAME OF ACCESS TARGET DB SERVER 316 | |
| TYPE OF ACCESS TARGET DB SERVER 317 | |
| NAME OF ACCESS TARGET NETWORK 318 | |
| TYPE OF ACCESS TARGET NETWORK 319 | |
| ACCESS TARGET TABLE 320 | |
| ACCESS TARGET COLUMN 321 | |
| ACCESS TARGET COLUMN ATTRIBUTE 322 | |
| DATA SIZE OF THE RESULT 323 | |
| DATA SIZE OF THE INTERMEDIATE RESULT 324 | |
| NUMBER OF RECORDS OF THE RESULT 325 | |
| NUMBER OF RECORDS OF THE INTERMEDIATE RESULT 326 | |
| RANGE OF TIME 327 | |

(REPEATABLE)

QUERY OPERATION DIRECTION 330

| KEY 331 | DIRECTION 332 |
|---|---|
| JOIN METHOD 333 | |
| JOIN ORDER 334 | |
| POSITION OF JOIN 335 | |
| POSITION OF SELECTION 336 | |
| POSITION OF SUBQUERY 337 | |
| POSITION OF GROUPING 338 | |
| POSITION OF SORTING 339 | |
| EMPLOYMENT OF REPLICA 340 | |
| TIME TO THE HALT OF EXECUTION 341 | |
| TIME TO THE DELAY OF EXECUTION 342 | |
| TIME TO THE WARNING CAUSED ON EXECUTION 343 | |
| NUMBER OF RECORDS IN THE TABLE 344 | |
| MAXINUN VALUE OF THE COLUMN 345 | |
| MINIMUM VALUE OF THE COLUMN 346 | |
| NUMBER OF UNIQUE VALUES OF THE COLUMN 347 | |
| MAXIMUM NUMBER OF UNIQUE VALUES OF THE COLUMN 348 | |

OPERATION FOR MERGING QUERY OPERATION DIRECTIONS 500

| A \ B | FORCE | RECOMMEND | NEUTRAL | AVOID | DISALLOW |
|---|---|---|---|---|---|
| FORCE | FORCE | FORCE | FORCE | FORCE | CONFLICT |
| RECOMMEND | FORCE | RECOMMEND | RECOMMEND | NEUTRAL | DISALLOW |
| NEUTRAL | FORCE | RECOMMEND | NEUTRAL | AVOID | DISALLOW |
| AVOID | FORCE | NEUTRAL | AVOID | AVOID | DISALLOW |
| DISALLOW | CONFLICT | DISALLOW | DISALLOW | DISALLOW | DISALLOW |

FIG. 6

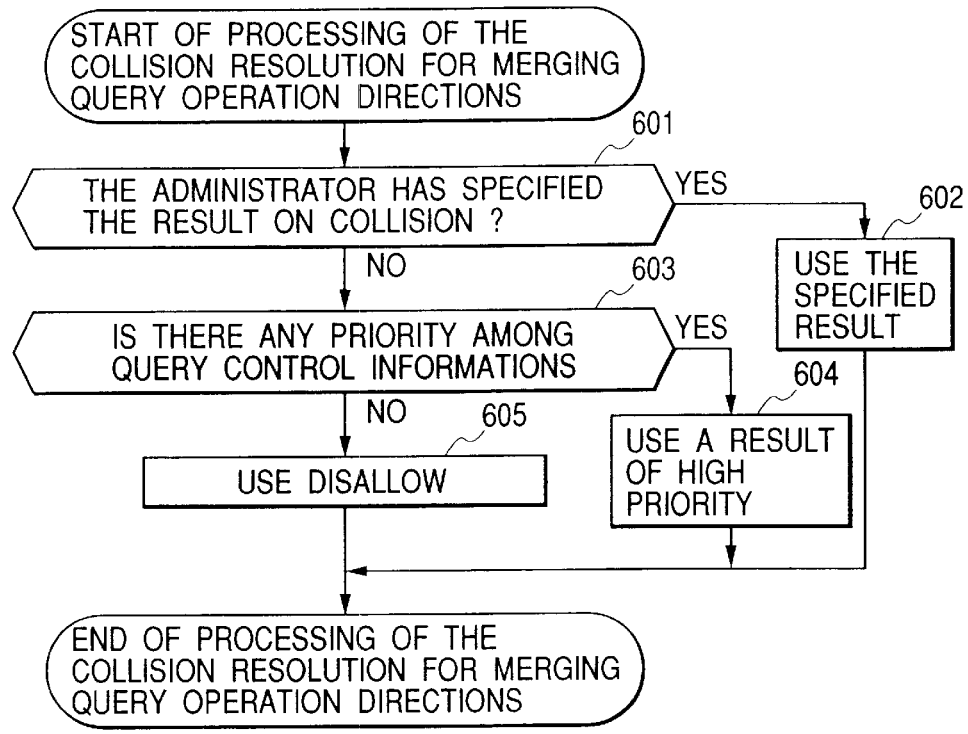

FIG. 7

OPTIMIZATION LOGIC OF JOIN METHODS

700

| ROW | CONTENTS |
|---|---|
| 1 | DETERMINATION OF JOIN METHOD (TABLE X, TABLE Y) { |
| 2 |   INNER TABLE :=SMALL TABLE; OUTER TABLE :=LARGE TABLE; |
| 3 |   if(THE INTERMEDIATE RESULT OF INNER TABLE IS unique) { |
| 4 |     JOIN METHOD A; |
| 5 |   } else if(|INNER TABLE| SMALL) { |
| 6 |     JOIN METHOD B; |
| 7 |   } else if(TRANSFER SIZE OF THE INNER TABLE<TRANSFER SIZE OF THE OUTER TABLE) { |
| 8 |     if(!THE INNER TABLE TRANFERRABLE) { |
| 9 |       JOIN METHOD C; |
| 10 |     } else { |
| 11 |       JOIN METHOD D; |
| 12 |     } |
| 13 |   } else { |
| 14 |     JOIN METHOD E; |
| 15 |   } |
| 16 | } |

FIG. 8
JOIN METHOD WITH OPTIMIZATION CONTROL OPTIMIZATION LOGIC 800

| ROW | CONTENTS |
|---|---|
| 1 | DETERMINATION OF JOIN METHOD (TABLE X, TABLE Y, QUERY OPERATION DIRECTION d) { |
| 2 |    INNER TABLE := SMALL TABLE; OUTER TABLE := LARGE TABLE; |
| 3 |    if(THE INTERMEDIATE RESULT OF INNER TABLE IS unique && !NOT USABLE (A, d. THRESHOLD VALUE) \|\| USABLE(A, d, THRESHOLD VALUE)) { |
| 4 |      JOIN METHOD A; |
| 5 |    } else if((\|INNER TABLE\| SMALL &&! NOT USABLE(B, d, THRESHOLD VALUE) \|\| USABLE (B, d, THRESHOLD VALUE)) { |
| 6 |      JOIN METHOD B; |
| 7 |    } else if(TRANSFER SIZE OF THE INNER TABLE<TRANSFER SIZE OF THE OUTER TABLE) { |
| 8 |      if(!THE INNER TABLE TRANFERRABLE &&! NOT USABLE(C, d, THRESHOLD VALUE) \|\| USABLE(C, d, THRESHOLD VALUE)) { |
| 9 |        JOIN METHOD C; |
| 10 |      } else if(!NOT USABLE(C, d, THRESHOLD VALUE) \|\| USABLE(C, d, THRESHOLD VALUE)) { |
| 11 |        JOIN METHOD D; |
| 12 |      } |
| 13 |    } else if(!NOT USABLE(C, d, THRESHOLD VALUE) \|\| USABLE(C, d, THRESHOLD VALUE)) { |
| 14 |      JOIN METHOD E; |
| 15 |    } |
| 16 |    if(JOIN METHOD UNDETERMINED) { |
| 17 |      JOIN METHOD E; |
| 18 |    } |
| 19 | } |

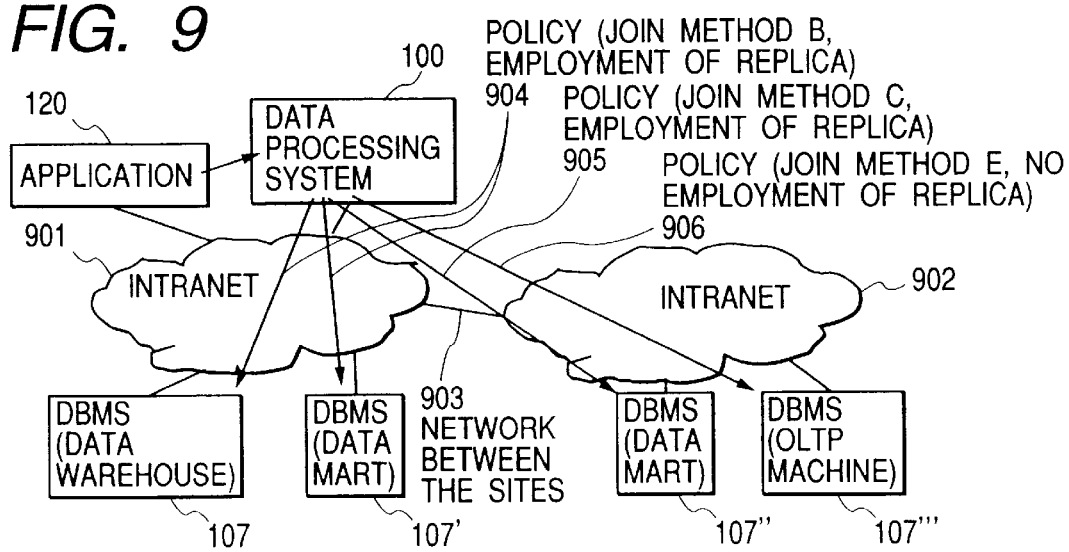

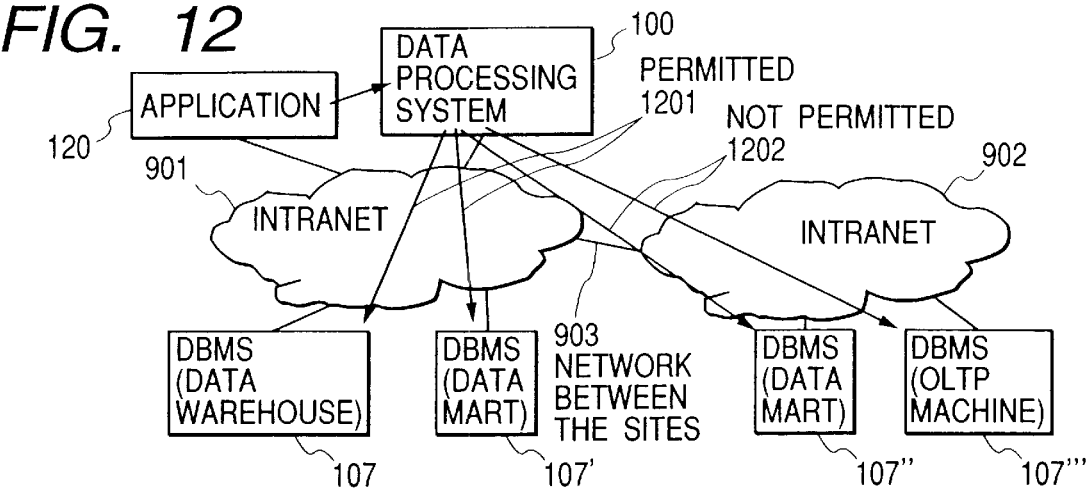

FIG. 13

JOIN METHOD WITH OPTIMIZATION LOG OPTIMIZATION LOGIC 1300

| ROW | CONTENTS |
|---|---|
| 1 | DETERMINATION OF JOIN METHOD (TABLE X, TABLE Y, QUERY OPERATION DIRECTION d) { |
| 2 |   INNER TABLE :=SMALL TABLE; OUTER TABLE :=LARGE TABLE; |
| 3 |   if(THE INTERMEDIATE RESULT OF INNER TABLE IS unique && !NOT USABLE (A, d. THRESHOLD VALUE) \|\| USABLE(A, d, THRESHOLD VALUE)) { |
| 4 |     JOIN METHOD A; |
| 5 |     log(DETERMINATION OF JOIN METHOD, STATUS 1301, d, JOIN METHOD A); |
| 6 |   } else if(\|INNER TABLE\| SMALL &&! NOT USABLE(B, d, THRESHOLD VALUE) \|\| USABLE (B, d, THRESHOLD VALUE)) { |
| 7 |     JOIN METHOD B; |
| 8 |     log(DETERMINATION OF JOIN METHOD, STATUS 1302, d, JOIN METHOD B); |
| 9 |   } else if(TRANSFER SIZE OF THE INNER TABLE<TRANSFER SIZE OF THE OUTER TABLE) { |
| 10 |     if(!THE INNER TABLE TRANFERRABLE &&! NOT USABLE(C, d, THRESHOLD VALUE) \|\| USABLE(C, d, THRESHOLD VALUE)) { |
| 11 |       JOIN METHOD C; |
| 12 |       log(DETERMINATION OF JOIN METHOD, STATUS 1303, d, JOIN METHOD C); |
| 13 |     } else if(!NOT USABLE(D, d, THRESHOLD VALUE) \|\| USABLE(D, d, THRESHOLD VALUE)) { |
| 14 |       JOIN METHOD D; |
| 15 |       log(DETERMINATION OF JOIN METHOD, STATUS 1304, d, JOIN METHOD D); |
| 16 |     } |
| 17 |   } else if(!NOT USABLE(E, d, THRESHOLD VALUE) \|\| USABLE(E, d, THRESHOLD VALUE)) { |
| 18 |     JOIN METHOD E; |
| 19 |     log(DETERMINATION OF JOIN METHOD, STATUS 1305, d, JOIN METHOD E); |
| 20 |   } |
| 21 |   if(JOIN METHOD UNDETERMINED) { |
| 22 |     JOIN METHOD E; |
| 23 |     log(DETERMINATION OF JOIN METHOD, STATUS 1306, d, JOIN METHOD E); |
| 24 |   } |
| 25 | } |

METHOD AND SYSTEM FOR QUERY PROCESSING

BACKGROUND OF THE INVENTION

The present invention relates to a computer system and more particularly to a method and a system for query processing, which process queries from users using one or more databases.

In recent years, there exist many database management systems (DBMS) in company's computer systems. From a historical point of view, those DBMSs have been added on a purpose base keeping pace with the development of the companies. Deregulation among different categories of industries is now rapidly progressing, which strengthens the tendency of the companies to add new operations to the existing ones. In this case, in response to the introduction of the new operations, an additional new DBMS is often introduced into the existing system.

On the other hand, each company is trying to provide the customers with better services including a new service differentiated from others, and as a result is trying to acquire a larger number of excellent customers. In such cases, because the company is more often required to analyze the company's activities, the customers' trends, and the like the data of which are accumulated in the DBMS group, the number of the companies that construct a data warehouse and a data mart are significantly increasing.

To construct the data warehouse and the data mart, it is necessary to put together data accumulated in the above-mentioned large number of DBMSs into one logically integrated database. In addition, beside the construction of database that is used as a base of analysis processing such as the data warehouse and the data mart, for the purpose of rapid starting of new operations, the existing DBMS groups are logically integrated to enhance competitiveness. It is because the logically integrated database as a base enables the company to construct application programs (applications) for the new operations in a shorter period of time.

Not only two or more DBMS groups within one company but also DBMS groups across two or more companies are now increasingly integrated. For example, a company group forming a group of companies integrates their information infrastructures to increase their profits as a whole; and companies in alliance with each other integrate their information infrastructures when they form a virtual alliance of the companies. Integration of the information infrastructures over a wider range provides applications developed on this integrated information infrastructure with commonality among a large number of divisions. As a result of it, overlap of application development can be avoided.

As a method for integrating the information infrastructures, there is a method of placing a "database hub" system, which provides access to the DBMS group in an integrated manner, between the DBMS group and an application group. In this method, the database hub receives a query (typically, a query described in Structured Query Language (SQL)) from an application, and then disassembles the query and converts it into an appropriate query to the DBMS group. After that, the database hub issues this disassembled and converted query to the DBMS group, collects data to create a result of the query from the DBMS, obtains the final result of the query received from the application, and returns the result to the application.

As a result of the integration of the information infrastructures, a variety of application queries are issued to the database hub. Those queries range over various kinds of queries such as a complex query for analysis operations, and a simple query for routine tasks. In particular, in the case of the complex query for analysis operations, the database hub and the optimization of the queries to the DBMS group concealed behind the database hub play an important role in performing the queries at high speed.

The optimization of the queries is broadly categorized into two groups: a rule-based query optimization and a cost-based query optimization. The cost-based query optimization, for example, is described in "Access Path Selection in a Relational Database Management System" written by P. G. Selinger and others (ACM SIGMOD Conference, May 1979, pp. 23–34; hereinafter referred to as Reference 1). In addition, those two kinds of optimizations are applied in a system (hereinafter referred to as Prior Art 1) described in "Oracle 8 Server Release 8.0, Overview: vol. 2" written by Oracle Corporation (pp. 19-7–9-11, Oracle Corporation, June 1997; hereinafter referred to as Reference 2). The cost-based query optimization provides the best query execution procedure (query execution plan) among various execution possibilities from the standpoint of execution cost.

Therefore, it is thought that the cost-based query optimization is suitable for the complex query. In fact, the cost-based query optimization is applied to many DBMS products, and enormous efforts are being expended to enhance it.

In reality, however, even if the cost-based query optimization is applied, the query is not always well optimized. As a result, the query is often processed by the execution plan that cannot be said to be the best for the user. There are two reasons for it.

Firstly, a query issued by an application is becoming complex at higher pace than that of technical enhancement of the cost-based optimization. Secondly, the cost-based optimization requires statistical information about a target database. However, there is a limit of details of the statistical information. Taking a relational database (a database which stores data in one or more tables consisting of one or more records having one or more columns) as an example, the following data are usually used as the statistical information: size of the table (number of records in the table); the minimum value, the maximum value, and an average value of values in the columns; number of different values in the columns; existence/nonexistence of NULL value in the columns; and distribution of values in the columns. Regarding the cost-based optimization, the cost of a series of processing to obtain a result of the query is calculated using that statistical information. However, because the statistical information is merely data characteristics summary that is viewed from several aspects, it is difficult to estimate the correct cost of the series of processing completely.

To address this problem, in a system (hereinafter referred to as Prior Art 2) described in "Oracle 8 Server Release 8.0 Tuning" (pp. 8-8 to 8-27, Oracle Corporation, September 1997; hereinafter referred to as Reference 3), the application is allowed to direct a query optimization method to the query either by query unit or by user. However, because the direction can be given only by query unit or by user, it remains impossible to give an optimization direction in block to a group of queries that have been issued from different applications, and it also remains impossible to give the optimization direction in block to a group of queries that have common characteristics.

The following is an example: In the integration of the information infrastructures across two or more companies as described above, a database hub and a DBMS group under the database hub process queries which are issued from various organizations, divisions and posts, and which are related to operations with a variety of complexity and urgent necessity. For example, if two companies use a common application, and if there is a situation in which different optimization methods are required for optimization of a query from one company and for optimization of a query from another company, it remains impossible to address this case using the direction of optimization method by query unit or by user. Such differentiation of the optimization methods should not be realized by modifying the application. It is recommended that an administrator handling the database hub and the DBMS group under the database hub can control the differentiation in a batch.

In short, a first problem that is addressed by the present invention is to enable the administrator to control operation of the database hub and the DBMSs in a batch without modifying the application.

In addition, as described above, the conventional cost-based optimization including Prior Art 1 is realized using the contents of the database (the statistical information about tables and columns) and information about a system (processor performance of a machine, input/output performance, network performance, etc.). (Those two kinds of information are generically called "statistical information".) However, an aspect of system administration that the administrator considers is not reflected in the cost-based optimization. The aspect of system administration is based on consideration of the characteristics of various system operations, and includes the reduction of load to a specific DBMS in a specific time period, and the reduction of load to a specific network. More specifically, because the DBMS that performs Online Transaction Processing (OLTP) processes operations with highly urgent necessity, the administrator sometimes wants to suppress analysis queries issued to such DBMS with the exception of some kinds. The conventional cost-based optimization for the database hub and the DBMSs, however, cannot reflect such request.

In short, a second problem that is addressed by the present invention is to control the query optimization in response to the request from the system administrational aspect.

In addition, as described above, the cost-based optimization highly depends on the existence of the detailed statistical information. If there is not enough or no statistical information, in many cases it is difficult to obtain a good execution plan by the cost-based optimization. In contrast to the conventional DBMS where the query optimization can be processed as a whole within a single DBMS, the integration of the information infrastructures is related to two or more DBMSs when a query generally issued by an application is executed. Moreover, those DBMSs generally exist in different divisions, and different companies. Therefore, because of the constraints among divisions and companies associated with management, security, contract, and the like, it may be impossible to obtain (or it is very difficult to obtain) enough statistical information to execute the cost-based optimization. In such cases, obtaining all of the statistical information is not recommended. There is a necessity to be capable of indicating statistical information, which should be used in a specific situation, to the database hub and the DBMSS.

In short, a third problem that is addressed by the present invention is to indicate the statistical information, which should be used in a specific situation, from outside the database hub and the DBMSs as necessary.

Next, according to the conventional technology, when a query is executed after query optimization, the execution plan that has been obtained by the query optimization is executed as it is. The aspect of system administration that the administrator considers, therefore, cannot be reflected in the cost-based optimization. The database hub and the DBMS group under the database hub simply process the query that is issued from various organizations, divisions and posts, and that is related to operations with a variety of complexity and urgent necessity. Therefore, it was difficult for the administrator to realize control over the query execution; for example, it was difficult to prohibit an application in a general division to access a specific DBMS of the associated company during the daytime.

In short, a forth problem that is addressed by the present invention is to control the query execution in response to the request from the system administrational aspect.

Finally, concerning the direction of query optimization including Prior Art 2, a human inspects the execution plan and manually gives direction one by one for the processing (for example, join method, join order, etc.) present in an inquiry. Because of it, the direction of query optimization is complicated and is prone to cause a mistake. In short, a fifth problem that is addressed by the present invention is to provide the human with support for creating a direction relating to the system operation for the query optimization and the query execution to ensure that the direction relating to the system operation for the query optimization and the query execution is easily performed without a mistake.

An object of the present invention is to provide a high performance and easy-to-use information system by addressing the five problems described above, and thereby realizing high speed operation as a whole system in response to the administrator's intention, even when the information infrastructures are integrated based on the integration of a plurality of DBMSs within a single company or across a plurality of companies.

SUMMARY OF THE INVENTION

As a means for solving the first problem, the present invention introduces a query classification definition and a query operation direction into the database hub (or the DBMS). The query classification definition is a method for classifying queries issued by applications based on various classifications and attributes. The query operation direction is a method for selecting operational options for query optimization and query execution. The present invention enables an administrator to associate the query classification definition with the query operation direction and to store them in the database hub (or the DBMS). The database hub (or the DBMS) obtains the query operation direction, which is associated with said query classification definition, for a group of queries classified by said query classification definition, and thereby changes the operation of query optimization and query execution. This solves the first problem that the administrator is required to control the operation of the database hub and the DBMS in a batch without modifying the application.

As a means for solving the second problem, in the present invention, the query classification definition and the query operation direction provide control over a method for creating an execution plan for query optimization of the database hub and the DBMS (a method for selecting join method, join order, record selection processing, grouping processing, sort processing, subquery processing, etc.). In order to start the query operation direction selectively in response to the system administrational aspect, the query classification definition is allowed to have specifications including a type of DBMS (that is accessed by the database hub according to the query classification definition), and a range of time. This solves the second problem that it is necessary to control the query optimization in response to the system administrational aspect.

As a means for solving the third problem, in the present invention, the query classification definition and the query operation direction enables the administrator to set the statistical information partially to the database hub and the DBMS associating with the group of queries.

The cost-based optimization, therefore, can be performed without obtaining the statistical information exhaustively.

Accordingly, this solves the third problem that it is necessary to input the statistical information (that should be used in a specific situation) to the database hub and the DBMS from the outside as necessary.

As a means for solving the fourth problem, in the present invention, the query classification definition and the query operation direction provide control over the execution operation of the database hub and the DBMS for the group of queries. More specifically, it is possible to halt or delay the query execution and to issue a warning in response to the following information: a specific organization, division, and post; the complexity and the urgency of operations; a type of DBMS to be accessed; the amount of data to be obtained; and the like. This solves the fourth problem that it is necessary to control the query execution in response to the system administrational aspect.

As a means for solving the fifth problem, in the present invention, the following functions are added to the database hub and the DBMS: presentation of information that has been missing at the time of optimization; identification of the query operation direction that has been used; presentation of recommended values for the classification definition of a query group; and presentation of recommended values for the operation direction of the query group. This solves the fifth problem that provides the administrator with support for setting the query classification definition and the query operation direction.

BRIEF DESCRIPTION OF THE DRAWINGS

FIG. 3 is a layout diagram of query control information;

FIG. 6 is a flowchart of collision resolution for merging query operation directions;

FIG. 7 is an explanatory drawing of query optimization processing;

FIG. 8 is an explanatory drawing of query optimization processing that uses a query operation direction;

FIG. 9 is an explanatory drawing of optimization operation that does not use a query classification definition and a query operation direction;

FIG. 12 is an explanatory drawing of query execution operation that uses a query classification definition and a query operation direction;

FIG. 13 is an explanatory drawing of optimization logic of join method with optimization log.

DETAILED DESCRIPTION OF THE INVENTION

One of the preferred embodiments of the present invention will be described with reference to the drawings.

(a) Overall Configuration 1

Figure 1:
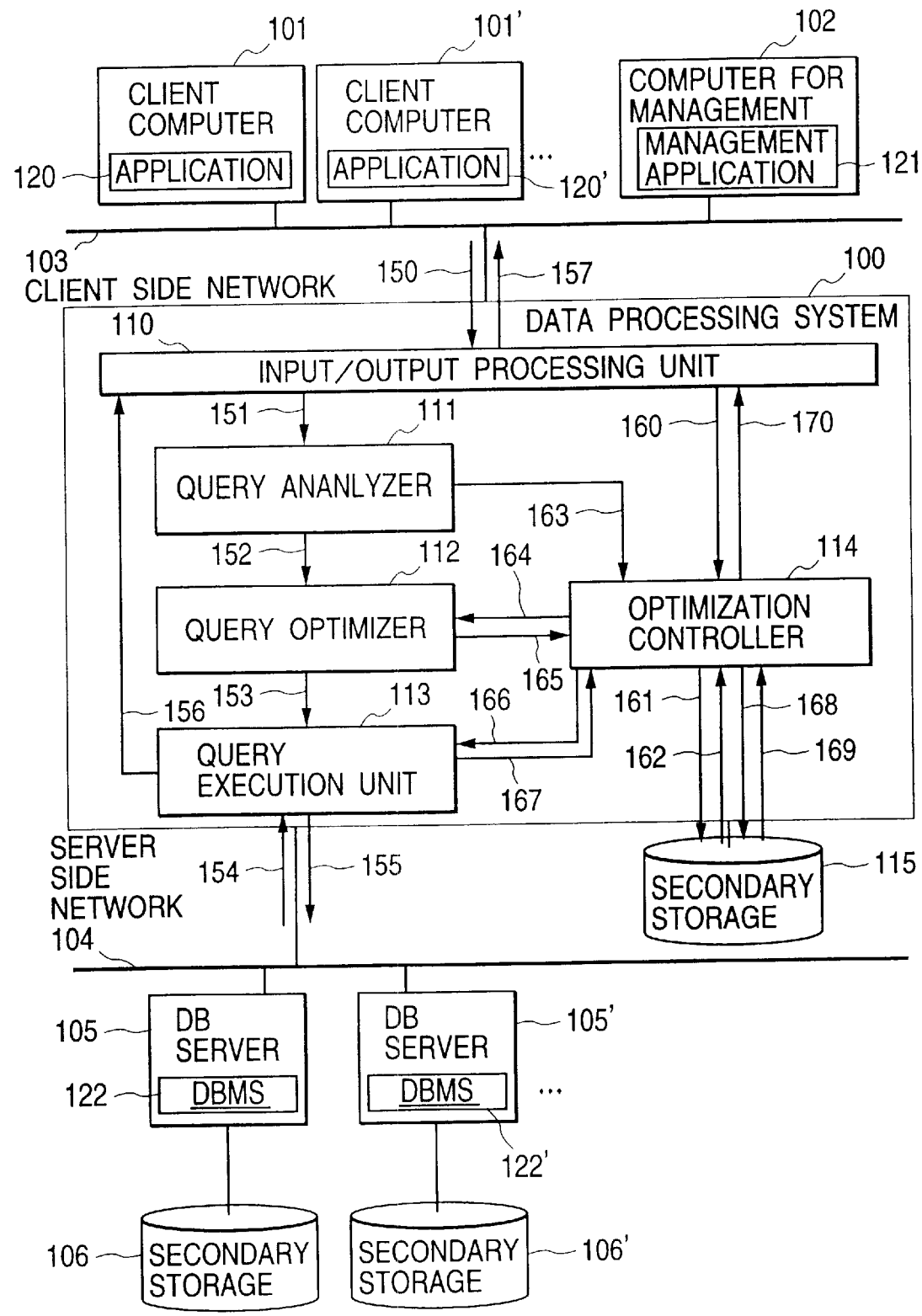
FIG. 1 is a block diagram of the first embodiment showing an overall configuration.

An overall configuration of the preferred embodiment of the present invention (the first embodiment) will be described by way of FIG. 1 showing the overall configuration.

FIG. 1 shows a computer system to which the first embodiment is suitably applied. The first embodiment is as a whole a computer system in which one or more computers (a data processing system 100, one or more client computers 101, 101', . . . , a computer for management 102, one or more DB servers 105, 105', . . . ) are mutually connected through a client side network 103 and a server side network 104.

The client side network 103 and the server side network 104 may be a LAN that is usually used in an organization (a company, a school, and a similar organization) covering a part or the whole of the organization, and may also be a part or the whole of a WAN that connects two or more geographically distributed sites. In addition, those networks may also be a network connection between computers and/or a network connection between processor elements in a parallel computer. Moreover, the client side network 103 and the server side network 104 may be the same network.

The data processing system 100, the client computers 101, 101', . . . , the computer for management 102, the DB servers 105, 105', . . . may be any type of computer including so called a personal computer, a workstation, a parallel computer, a mainframe computer, and a small portable computer. In FIG. 1, each of the data processing system 100, the client computers 101, 101', . . . , the computer for management 102, the DB servers 105, 105', . . . is shown as an independent computer. However, any combination of those computers may be one computer. The numbers of the data processing system 100, the client computers 101, 101', the computer for management 102, the DB servers 105, 105', . . . , the client side network 103, the server side network 104, and their configuration in FIG. 1 are shown as an example, therefore, do not limit the scope of the present invention.

Applications 120, 120', . . . , which are programs for user's processing, operate on the client computers 101, 101', . . . . The application 120 issues a query (for example, a query described in a query language such as Structured Query Language (SQL)) to make reference or update a database as necessary.

The DB servers 105, 105', . . . , have one or more databases. DBMS 122, which is a program for making reference or updating the database in response to a query from the other program, operates on the DB servers 105, 105', . . . . In many cases, the DBMS 122 keeps one or more databases as its management target data in secondary storages 106, 106', . . . . The database may be a relational database that is comprised of one or more tables consisting of one or more records having one or more columns, and may also be other types of databases (network-type database, hierarchical database, object-oriented database, and object storage) or file systems.

Data processing system 100 receives a first query issued by the client computers 101, 101', . . . , creates one or more second queries and issues them to the DB servers 105, 105', . . . as necessary, executes a reference or an update that are specified by the first query, and then returns a result data to the client computer that issued the first query. In short, the data processing system 100 is a database hub that realizes an uniform access to a group of databases possessed by the DB servers 105, 105', . . . , and that provides the client computers 101, 101', . . . , with an integrated database.

The computer for management 102 executes management application 121. The management application 121 is a program for managing the data processing system 100, and is typically used by an administrator of the data processing system 100 or of the whole system shown in FIG. 1.

An input/output processing unit 110, a query analyzer 111, a query optimizer 112, a query execution unit 113, an optimization controller 114, and a secondary storage 115 are the components that comprise the data processing unit 100. Only overview of those components is described here, and detailed information about their operations is described later.

The input/output processing unit 110 accepts a query request from the client computers 101, 101', . . . , and a management request from the computer for management 102, and replies to those requests.

The query analyzer 111 performs lexical analysis, syntactic analysis, and semantic analysis of the query request received by the input/output processing unit 110, performs standard conversion of query conditions as necessary, and then generates a parse tree from the query.

The query optimizer 112 optimizes the query using the parse tree generated by the query analyzer 111, and generates procedures of a series of operations (an execution plan) to obtain a result of the query. In the case of the relational database, the series of operations include selection processing, projection processing, join processing, grouping processing, and sort processing. The execution plan is a data structure that describes how to apply those operations to a target database (i.e., the target database, the target DB server 105, and an order of processing are described).

The query execution unit 113 executes the execution plan generated by the query optimizer 112. The query execution unit 113 may request the DB servers 105, 105', . . . , to process a part or the whole of the series of operations by issuing a query to the DB servers 105, 105', . . . . The query execution unit 113 may also execute a part or the whole of the series of operations by itself to process data collected from the DB servers 105, 105', . . . .

The optimization controller 114 interprets the management request received by the input/output processing unit 110, and stores a query classification definition and a query operation direction included in the management request to the secondary storage 115 as necessary. Moreover, the optimization controller 114 obtains the query (and additional information of the query) received by the query analyzer 111, obtains a query operation direction that matches the query according to the query classification definition, and then give the query operation direction to the query optimizer 112 and the query execution unit 113.

Up to this point the overall configuration of the first embodiment is described.

(b) Overall Configuration 2

Figure 2:
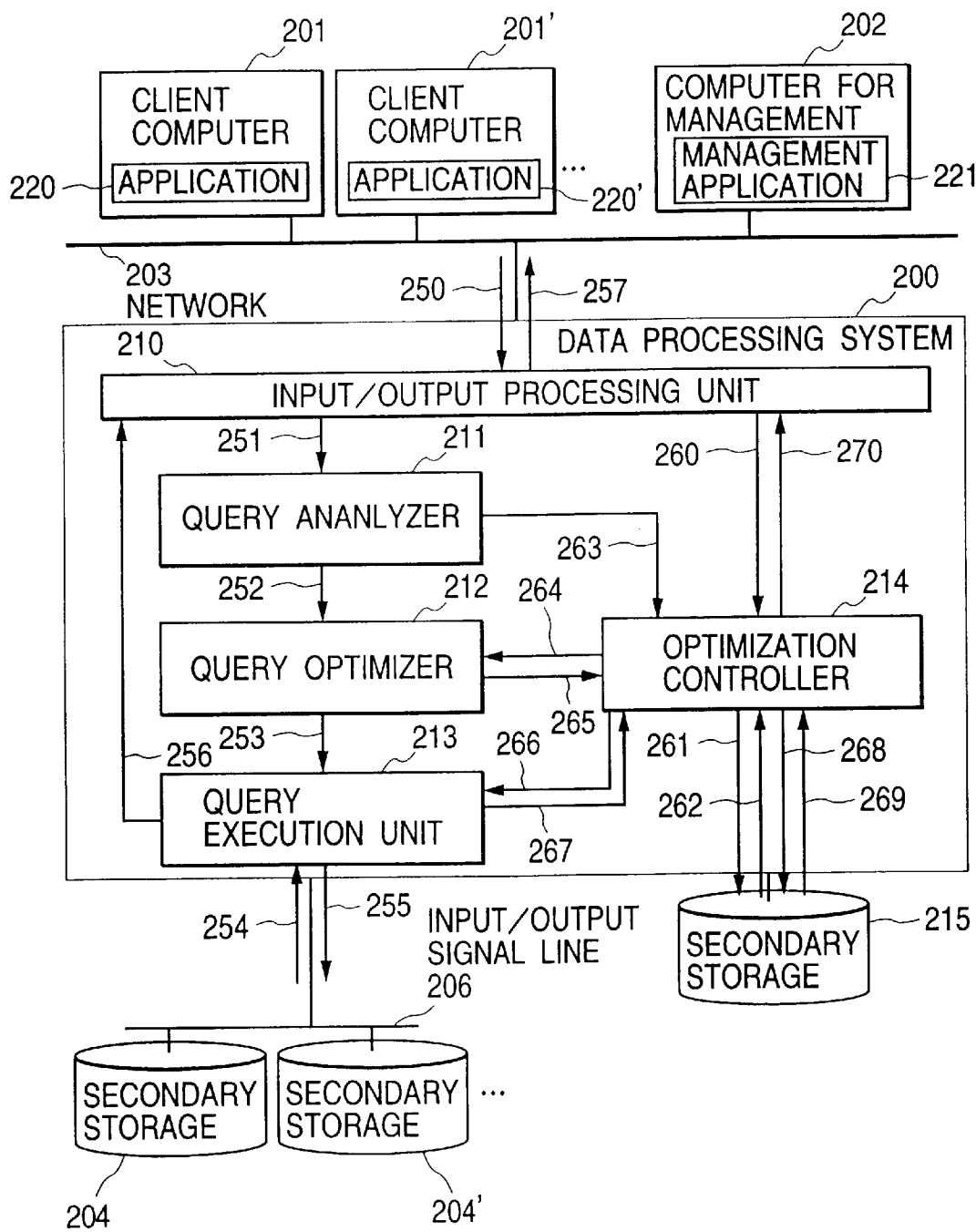
FIG. 2 is a block diagram of the second embodiment showing an overall configuration.

An overall configuration of another preferred embodiment of the present invention (the second embodiment) is described by way of FIG. 2. FIG. 2 shows a computer system to which the second embodiment is suitably applied. The second embodiment is as a whole a computer system in which one or more computers (data processing system 200 that has a DBMS function in FIG. 1, one or more client computers 201, 201', . . . , a computer for management 202) and secondary storages 204, 204', . . . , are mutually connected through a network 203 and an input/output signal line 206.

The network 203 may be a LAN that is usually used in an organization (a company, a school, and a similar organization) covering a part or the whole of the organization, and may also be a part or the whole of a WAN that connects two or more geographically distributed sites. In addition, the network 203 may also be a network connection between computers or a network connection between processor elements in a parallel computer.

The input/output signal line 206 is a connection line that connects the data processing system 200 to the secondary storages 204, 204', . . . . The input/output signal line 206 may be a cable (SCSI cable, etc.) connected between the computer and the secondary storage or a network. The network may be a LAN that is usually used in an organization (a company, a school, and a similar organization) covering a part or the whole of the organization, and may also be a part or the whole of a WAN that connects two or more geographically distributed sites. In addition, the input/output signal line 206 may also be a network connection between computers or a network connection between processor elements in a parallel computer. Moreover, the network 203 and the input/output signal line 206 may be the same network.

The data processing system 200, the client computers 201, 201', . . . , the computer for management 202 may be any type of computer including so called a personal computer, a workstation, a parallel computer, a mainframe computer, and a small portable computer. In FIG. 2, each of the data processing system 200, the client computers 201, 201', . . . , the computer for management 202 is shown as an independent computer. However, any combination of those computers may be one computer. The numbers of the data processing system 200, the client computers 201, 201', . . . , the computer for management 202, the network 203, the input/output signal line 206, and their configuration in FIG. 2 are shown as an example, therefore, do not limit the scope of the present invention.

Applications 220, 220', . . . , which are programs for user's processing, operate on the client computers 201, 201', . . . . The application 220 issues a query (for example, a query described in a query language such as Structured Query Language (SQL)) to make reference or update a database as necessary.

The data processing system 200 have one or more databases, and executes a database management system that makes reference or updates the database in response to a query from the other programs. In many cases, the data processing system 200 keeps one or more databases as its management target data in the secondary storage 204, 204', . . . . The database may be a relational database that is comprised of one or more tables consisting of one or more records having one or more columns, and may also be other types of databases (network-type database, hierarchical database, object-oriented database, and object storage) or file systems.

The computer for management 202 executes management application 221. The management application 221 is a program for managing the data processing system 200, and is typically used by the administrator of the data processing system 200 or of the whole system shown in FIG. 2.

The input/output processing unit 210, the query analyzer 211, the query optimizer 212, the query execution unit 213, the optimization controller 214, and the secondary storage 215 are the components comprising a database management system that operates on the data processing system. 200. Only overview of those components is described here.

The input/output processing unit 210 accepts a query request from the client computer 201, 201', . . . , and a management request from the computer for management 202, and replies to those requests.

The query analyzer 211 performs lexical analysis, syntactic analysis, and semantic analysis of the query request received by the input/output processing unit 210, and performs standard conversion of query conditions as necessary, and then generates a parse tree from the query.

The query optimizer 212 optimizes the query using the parse tree generated by the query analyzer 211, and generates procedures of a series of operations (an execution plan) to obtain a result of the query. In the case of the relational database, the series of operations include selection processing, projection processing, join processing, grouping processing, and sort processing. The execution plan is a data structure that describes how to apply those operations to a target database (i.e., the target database, the target secondary storages 204, 204', . . . , and an order of processing are described).

The query execution unit 213 executes the series of operations described in the execution plan generated by the query optimizer 212 to process data collected from the secondary storages 204, 204', . . . .

The optimization controller 214 interprets the management request received by the input/output processing unit 210, and stores a query classification definition and a query operation direction included in the management request to the secondary storage 215 as necessary. Moreover, the optimization controller 214 obtains a query (and additional information of the query) received by the query analyzer 211, obtains a query operation direction that matches the query according to the query classification definition, and then gives the query operation direction to the query optimizer 212 and the query execution unit 213.

Up to this point the overall configuration of the second embodiment is described.

The input/output processing unit 210, the query analyzer 211, the query optimizer 212, the query execution unit 213, the optimization controller 214, the operation of the secondary storage 215, and the method of cooperation of those components (250–257, and 260–270) corresponds to the input/output processing unit 110, the query analyzer 111, the query optimizer 112, the query execution unit 113, the optimization controller 114, the operation of the secondary storage 115, and the method of cooperation of those components (150–157, and 160–170) in FIG. 1 respectively on the whole. Because of it, to avoid unnecessary overlaps of description, hereinafter operations that are common to both the first and the second embodiments will be described by way of FIG. 1. An additional description will be provided only when there is a significant difference between the first and the second embodiments.

(c) Data Structure

Data structures of the query classification definition and the query operation direction will be described by way of FIG. 3.

The query classification definition is a method for classifying queries issued by applications based on various classifications and attributes. The query operation direction is a method for selecting operational options for query optimization and query execution. The administrator associates the query classification definition with the query operation direction and stores them in the data processing system 100 (the data processing system 200 in the second embodiment).

The data processing system 100 (the data processing system 200 in the second embodiment) obtains the query operation direction, which is associated with the query classification definition, for a group of queries classified by the query classification definition, and thereby changes the operation of query optimization and query execution. This enables the administrator to control the operation of the data processing system 100 (the data processing system 200 in the second embodiment), for two or more queries (a query group) issued by two or more applications, in a batch without modifying the applications.

Query control information 300 is a data structure that stores one or more pairs of the query classification definition 310 and the query operation direction 330. Each pair of the query classification definition 310 and the query operation direction 330 has a unique ID 301.

The query control information 300 is a data structure that is kept in memory by the optimization controller 114, and that is stored and kept in the secondary storage 115. The query classification definition 310 and the query operation direction 330 are included in a management request that is issued from the management application 121 to the data processing system 100. The query classification definition 310 and the query operation direction 330 that are given from the management application 121 are added to and kept in the query control information 300.

The query classification definition 310 is a data structure that defines a type of a control target query. The query classification definition 310 has information about characteristics of a part or the whole of the query, and accordingly is used to determine whether or not a part or the whole of the query belongs to a specific query group associated with the query classification definition 310 by checking whether or not the query has the characteristics.

The query operation direction 330 is a data structure that specifies operations of query optimization and query execution. Each query operation direction 330 is associated with one query classification definition 310 on the query control information 300. When a first query that belongs to a query group defined by the query classification definition 310 is issued from the application 120, the query optimization and the query execution of the first query are performed according to the query operation direction 330 associated with the query control information 300.

Key 311 is an item name that can be specified in the query classification definition 310. Pattern 312, which is a pattern showing the range of a value associated with the key 311, keeps one or more values, the range of the values, or patterns of the values (in normalized expressions) associated with the key 311. In addition, the key 311 is allowed to have 'null' as a special value. When the key 311 is associated with the pattern 312 having 'null', the key 311 matches all queries.

Application name 313 is the name of the application 120 that issued the query. For example, if there are Marketing Support AP (AP is an abbreviation for "Application Program"), Sales Support AP, Risk Management AP, Product Management AP, and the like as applications of a certain company, the pattern 312 of the application name 313 may be, for example, "Marketing Support AP" (only Marketing Support AP matches the pattern), "Marketing Support AP, Product Management AP" (Marketing Support AP and Product Management AP match the pattern), ".X Support AP" (.X is a normalized expression representing a character string with a length of one or more characters; Marketing Support AP, Sales Support AP, etc. match the pattern).

Application type 314 is a type of the application 120 that issued the query. The application type may be an application product name, and may also be an application classification name. The pattern 312 may be, for example, "Online Analysis Tool manufactured by A", "Group of AP for branches", "Group of AP for a head office", "Group of AP for executives", and the like.

User organization 315 is an organization to which the users of the application 120 that issued the query belongs. The pattern 312 may be, for example, "First Sales Division", "System Development Department", "Planning Department", ". Division of Planning Department" (. represents any one character), and the like.

Name of access target DB server 316 is a name of the DB server 105 or the DBMS 122 that are accessed to obtain a result of the first query issued by the application 120. For example, "Product Planning Data Mart", "Tokyo Area POS Database", and the like are applicable.

Type of access target DB server 317 is a type of the DB server 105 or the DBMS 122 that are accessed to obtain a result of the first query issued by the application 120. For example, "Server Machine manufactured by A", "DBMS manufactured by B", "POS Database", and the like are applicable.

Name of access target network 318 is a name of a network that connects between the DB server 105 and the data processing system 100 when the DB server 105 is accessed to obtain a result of the first query issued by the application 120. For example, an Internet address of the network "133.144.10", a network name "XYZnet", and the like are applicable.

Type of access target network 319 is a type of a network that connects between the DB server 105 and the data processing system 100 when the DB server 105 is accessed to obtain a result of the first query issued by the application 120. "1 Gbps Ethernet", "10 Mbps Ethernet", "Fibre Channel", "128 Kbps leased line", and the like are applicable.

Access target table 320 is a name of a table that is accessed to obtain a result of the first query issued by the application 120. "Customer Table", "Product Price Table", and the like are applicable.

Access target column 321 is a name of a column that is accessed to obtain a result of the first query issued by the application 120. "Customer Address" column, "Product Price" column, and the like are applicable.

Access target column attribute 322 is an attribute of a column that is accessed to obtain a result of the first query issued by the application 120. "Unique Attribute Existent", "NOT NULL Attribute Existent", "Main Key", and the like are applicable.

Data size of the result 323 is an estimated amount of data for the final result of the first query issued by the application 120. "Less than or equal to 1000 bytes", "Greater than or equal to 10 Mbytes", and the like are applicable.

Data size of the intermediate result 324 is an estimated amount of data for the intermediate result that is obtained from the DB server 105 when the DB server 105 is accessed to obtain a result of the first query issued by the application 120. "Less than or Equal to 1000 bytes", "Greater than or equal to 10 Mbytes", and the like are applicable.

Number of records of the result 325 is an estimated line number of records for the final result of the first query issued by the application 120. "Less than or equal to 100 records", "Greater than or equal to 10000 records", and the like are applicable.

Number of records of the intermediate result 326 is an estimated number of records for the intermediate result that is obtained from the DB server 105 when the DB server 105 is accessed to obtain the result of the first query issued by the application 120. "Less than or equal to 100 bytes", "Greater than or equal to 100000 records", and the like are applicable.

Range of time 327 is a time when the data processing system 100 received the first query issued by the application 120. "From 9:00 to 17:00", "From 23:00 to 4:00 of the next day", and the like are applicable.

Key 331 is an item name that can be specified in the query operation direction 330. Direction 332, which is one or more directions (a pair of the range of a value and the strength of the direction) associated with the key 331, keeps one or more values or the range of the values associated with the key 331. The strength of the direction is "Force (always select)", "Recommended (select if possible)", "Neutral (not particularly specified: default)", "Deny (not select if possible)", or "Disallow (never select)".

Join method 333 specifies a method used for join. Examples of the direction (the value and the strength of the direction) are "Distributed nest loop join—Recommended", "Hash join at database hub—Deny", "Join by the range of a value—Neutral", and the like.

Join order 334 is a direction used with the query classification definition 310, which identifies two tables, in a pair. The join order 334 specifies which table becomes the right branch of an execution tree and which table becomes the left tree. Examples are "First table—Recommended", "Second table—Deny", and the like.

Position of join 335 specifies a device that executes join (the data processing system 100, or any DBMS). If the position of join 335 is used with the query classification definition 310, which identifies two tables, in a pair, the position of join 335 specifies the position of join when the two tables are joined. Examples are "Database hub—Recommended", "POS Database—Disallow", and the like.

Position of selection 336 is a direction used with the query classification definition 310, which identifies a table, in a pair. The position of selection 336 specifies the position in which selection processing (narrowing selected records) is performed for the table.

Position of subquery 337 is a direction used with the query classification definition 310, which identifies one or more tables, in a pair. The position of subquery 337 specifies the position in which subquery processing is performed for the one or more tables.

Position of grouping 338 is a direction used with the query classification definition 310, which identifies one or more tables or columns, in a pair. The position of grouping 338 specifies the position in which grouping processing is performed for the one or more tables or columns.

Position of sorting 339 is a direction used with the query classification definition 310, which identifies one or more tables or columns, in a pair. The position of sorting 339 specifies the position in which sorting processing is performed for the one or more tables or columns.

Employment of replica 340 specifies whether or not one or more replicas are used if a copy (replica) of a part or the whole of a table exists in the data processing system 100 and the DBMS 122, 122', . . . . Examples are "Use all replicas—Recommended", "Use a replica of DBMS X—Force", and the like.

Time to the halt of execution 341 specifies a length of time until a query is halted. If the time to the halt of execution 341 is used with the query classification definition 310, which specifies one or more DBMSs, in a pair, the time to the halt of execution 341 specifies a length of time until accesses to the one or more DMBSs are halted. Examples are "Greater than or equal to 10 minutes —Force", and the like.

Time to the delay of execution 342 specifies a length of time until a query is delayed. If the time to the delay of execution 342 is used with the query classification definition 310, which specifies one or more DBMSs, in a pair, the time to the delay of execution 342 specifies a length of time until accesses to the one or more DMBSs are delayed. Examples are "Greater than or equal to 10 minutes—Force", and the like.

Time to the warning caused on execution 343 specifies a length of time until a warning is given against a query. If the time to the warning caused on execution 343 is used with the query classification definition 310, which specifies one or more DBMSs, in a pair, the time to the warning caused on execution 343 specifies a length of time until a warning is given against an access to the one or more DMBSs. Examples are "Greater than or equal to 10 minutes—Force", and the like.

Number of records in the table 344 is statistical information representing the number of records in a certain table.

Maximum value of the column 345 is statistical information representing the maximum value in a certain column.

Minimum value of the column 346 is statistical information representing the minimum value in a certain column.

Number of unique values of the column 347 is statistical information representing the number of unique values in a certain column.

Maximum number of unique values of the column 348 is statistical information representing the maximum number of unique values in a certain column.

The number of records in the table 344, the maximum value of the column 345, the minimum value of the column 346, the number of unique values of the column 347, and the maximum number of unique values of the column 348 are used for cost calculation for the cost-based optimization. A program that collects statistical information can also automatically collect information equivalent to those items. However, as described in "Problems that are solved by the present invention", concerning the integration of the information infrastructures across divisions and companies, there is a situation where it is difficult to collect statistical information automatically. Those items are used in such situation.

(d) Flow of Query Processing Using Query Classification Definition and Query Operation Direction A flow of query processing including registration and use of the query classification definition and the query operation direction will be described by way of FIG. 1 and FIG. 4.

Firstly, registration of the query classification definition and the query operation direction will be described.

A first management request issued by the management application 121 arrives at the input/output processing unit 110 of the data processing system 100 through the client side network 103 (150). The input/output processing unit 110 identifies the request that arrived at input (that is to say, identifying the request as a query request from an application or a management request from the management application), and according to the result, sends the request to the query analyzer 111 (151) or to the optimization controller 114 (160).

The optimization controller 114 that received the first management request issued by the management application 121 retrieves the query classification definition 310 and the query operation direction 330 that are stored in the management request, and adds them to the query control information 300. In this case, a new ID is assigned to the query control information 300 as "ID 301". The query control information 300 exists in the following two locations: on a memory of the data processing system 100, and in the secondary storage 115. Accordingly, the processing that adds information to the query control information 300 includes the following two kinds of operations: operation on the memory, and addition to the query control information 300 in the secondary storage 115 (161). By the way, the query control information 300 on the memory is loaded from the query control information 300 in the secondary storage 115 (162) when the data processing system 100 starts up, and resides in the memory while the data processing system 100 is in operation.

Next, a flow of query processing will be described.

A first query issued by the application 120 arrives at the input/output processing unit 110 of the data processing system 100 through the client side network 103 (150). The input/output processing unit 110 identifies the request that arrived at input (that is to say, identifying the request as a query request from an application or as a management request from the management application), and according to the result, sends the request to the query analyzer 111 (151) or to the optimization controller 114 (160).

When receiving the first query, the query analyzer 111 performs lexical analysis, syntactic analysis, and semantic analysis of the first query. This series of processing generates the first parse tree from the first query. This parse tree includes at least the access target table 320 and the access target column 321, and also includes the access target column attribute 322 as necessary. By the way, the operations of lexical analysis, syntactic analysis, and semantic analysis will not be described in more detail here because they are technologies that are broadly used in many fields including compiler, and database management system.

The query analyzer 111 sends the first parse tree to the query optimizer 112 (152), and also sends the first parse tree and additional information about the first query to the optimization controller 114 (163). This additional information includes at least one of the following: the application name 313, the application type 314, the user name or the user organization name, the name of access target DB server 316, the type of access target DB server 317, the name of access target network 318, the type of access target network 319, and time at which the query has been received.

After receiving the first parse tree and the additional information about the first query, the optimization controller 114 performs query processing to search a pair of the query classification definition 310 and the query operation direction 330 that matches the first query expressed by the first parse tree and the additional information.

A flow of the processing will be described by way of FIG. 4.

Step 401 initializes the result of query pattern matching to 'null'.

Step 402 checks whether or not all lines of the query control information 300 are examined. If there is an unexamined line (NO), the processing proceeds to step 403. If all lines are examined (YES), the query matching processing ends.

Step 403 retrieves one query classification definition 310 from the query control information 300, and then judges whether or not the pattern 312 associated with that item (key 311) matches the pattern of the appropriate item in the first parse tree and the additional information. In this case, if the pattern 312 associated with the key 311 is 'null', the key 311 is regarded as having been matched.

Step 404 checks whether or not the pattern 312 of the query classification definition 310 retrieved in the step 403 matches the query pattern. If both patterns match each other (YES), the processing proceeds to step 405. In the step 405, the query operation direction 330 associated with the matched query classification definition 310 is stored as a result of the query pattern matching. After merging this result with the result of matching that has already been obtained, the processing returns to the step 402. If both patterns do not match (NO), the processing returns to the step 402.

By the way, when merging the query operation direction 330 that has matched this time with the result of the query operation direction 330 that has already been obtained, two or more directions may not be consistent (for example, there are two or more directions for the same direction item, but one direction specifies "Force" and another direction specifies "Disallow", and the like) How to address such cases will be described later.

From zero to one or more query operation direction (the first query operation direction) that has been finally obtained is the direction of optimization operation or execution operation, which the administrator intended for the first query. Optimization and execution for the first query are performed using them. In short, the optimization controller 114 sends the first query operation direction to the query optimizer 112 (164), and also sends the first query operation direction to the query execution unit 113 (166).

The query optimizer 112 performs query optimization using the first query operation direction obtained from the optimization controller 114 and the first parse tree obtained from the query analyzer 111, and creates an execution plan for the first query. In some cases, however, obtaining an additional query operation direction may be required besides the first query operation direction. For example, the amount of table data and the number of records are known at an intermediate stage of the cost-based optimization, and the query classification definition 310 is searched using this amount of data and this number of records to obtain a new query operation direction 330. The method for obtaining the query operation direction in this case will not be particularly described because it is the same as the query matching processing.

The first query execution plan is created by the cost-based optimization. The cost-based optimization will not be described in detail here because it is broadly known by Reference 1 and others. However, a method using the query operation direction for the cost-based optimization will be described later because it is not publicly known.

The following is an example of the execution plan (the first execution plan) created by the query optimizer 112, which is a tree expressed in list form: (database-hub-join [left.c1=right.c2 and left.c3<10, output left.c1, right.c2, left.c1+left.c3] (join at DBMS1 [left.c1<10 and left.c1= right.c4, output left.c1, left.c3] (selection at DBMS1 CustomerTable [1990<year and year<1999, output c1, c3]) (selection at DBMS1 ProductTable [1000<price and price<2000, output c4])) (selection at DBMS2 OrderTable [1990<year and year<1999, output c2])). This execution plan expresses a series of processing as follows: (1) Performing selection processing of CustomerTable at DBMS1 using the selection condition "1990<year and year<1999" and outputting the column c1 and c3 by projection processing; (2) Performing selection processing of ProductTable at DBMS1 using the selection condition "1000<price and price<2000" and outputting the column c4 by projection processing; (3) Performing selection processing of OrderTable at DBMS2 using the selection condition "1990<year and year<1999" and outputting the column c2 by projection processing; (4) Performing join at DBMS1 using the join condition "left.c1<10 and left.c1=right.c4" (assuming that the intermediate result of (1) is left and that the intermediate result of (2) is right) and outputting the column c1 and c3 by projection processing; (5) Performing join at the data processing system 100 using the join condition "left.c1=right.c2 and left.c3<10" (assuming that the intermediate result of (4) is left and that the intermediate result of (5) is right) and outputting left.c1, right.c2, left.c1+left.c3 by projection processing.

The query optimizer 112 sends the first execution plan that has been created to the query execution unit 113 (153).

The query execution unit 113 performs the first query using the query operation direction obtained from the optimization controller 114 and the first execution plan obtained from the query optimizer 112. The query execution unit 113 processes the first execution plan in the above-described example from the bottom up, that is to say, in the above-described order—(1), (2), (3), (4), and (5) (to be exact, (1), (2), and (3) can be executed in parallel). While processing, the query operation direction obtained from the optimization controller 114 is referred to at each step. If the time to the halt of execution 341 in the query operation direction is specified as "Less than or equal to 1 minute—Force", lapsed time after starting the step of (2) is measured. If an intermediate result is not created after one minute, processing of the first query is halted. If the query execution unit 113 finally executes all of the steps defined in the execution plan and thereby obtains the final result of the first query, the result is returned to the application 120, which has issued the first query, through the input/output processing unit 110 (156 and 157).

How to use the time to the delay of execution 342 and the time to the warning caused on execution 343 are also similar to the time to the halt of execution 341.

Up to this point the flow of the query processing is described.

(e) Merge Operation of Query Operation Directions

Figures 4, 5:
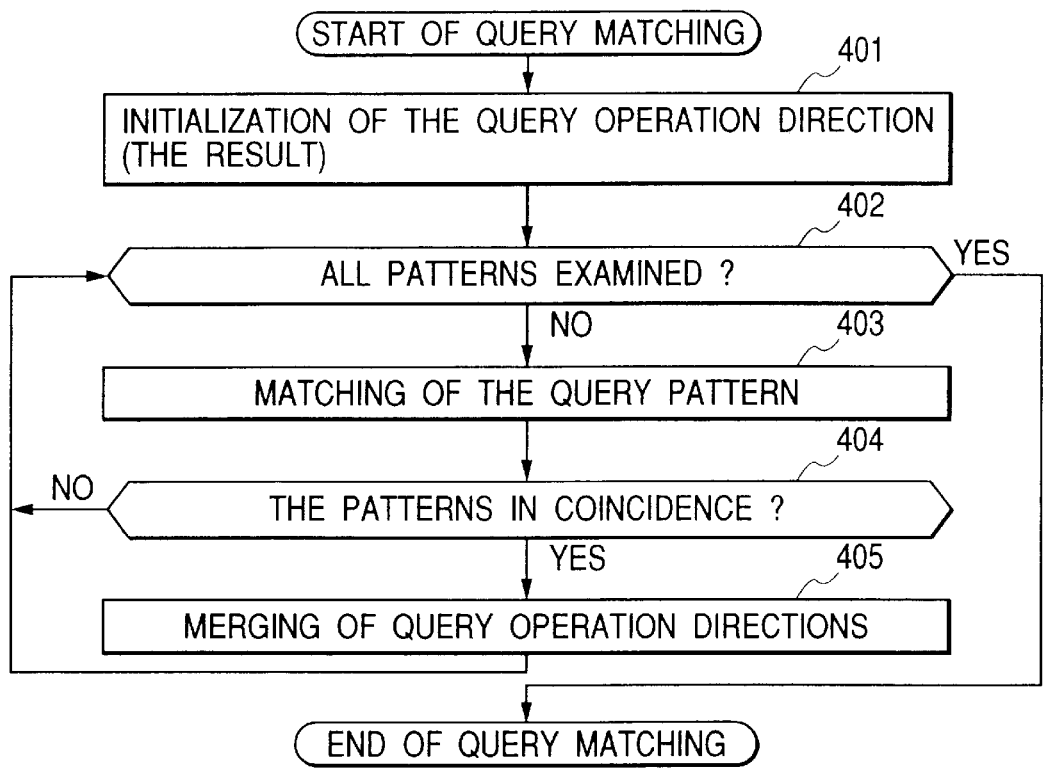
FIG. 4 is a flowchart of query pattern matching at the time of query processing.
FIG. 5 is a state transition diagram of operation for merging query operation directions.

Merge operation of query operation directions and a method of collision resolution when merging the query operation directions are described by way of FIG. 5 and FIG. 6.

The query operation direction associated with the first query can be obtained by merging one or more query operation directions 330, which match the first query, from the query control information 300. In step 405, each item (a pair of the key 331 and the direction 332) of the query operation direction 330 (the first query operation direction) that matches the first query as a result of judgment determines the merge operation in the following manners: (1) If the key of the item is not included in the second query operation direction, the item is added to the first query operation direction; (2) If the key of the item is included in the first query operation direction and there are two or more direction descriptions, the direction descriptions and the strength in the direction 332 are merged in the manner as shown in FIG. 5. FIG. 5 shows how to select the strength of output (after the second column and after the second row) for two inputs of strength (the first column and the first row).

For example, if the direction 332 of the first query operation direction is "Database hub—Recommended, POS database—Disallow", and if the direction 332 of the second query operation direction is "Database hub—Force", the directions relating to the database hub are overlapped between the two directions. In this case, because the strengths of the directions relating to the database hub are "Recommended" and "Force", output "Force" (corresponding to the third row of the second column) is obtained by referring to input A=Recommended and input B=Force. Accordingly, the result of merging the first and the second query operation directions is "Database hub Force, POS database—Disallow". (At this stage, "Database hub—Force" and "POS database—Disallow" are not merged. It is because merging at this level is influenced by semantic judgment. How to perform optimization operation or execution operation according to those two directions is judged by the query optimizer 112 and the query execution unit 113.)

Another example of (2) will be described as below. If the direction 332 of the first query operation direction is "Database hub—Disallow, POS database—Disallow", and if the direction 332 of the second query operation direction is "Database hub—Force", the directions relating to the database hub are overlapped between the two directions. In this case, because the strengths of the directions relating to the database hub are "Disallow" and "Force", output "Conflict" (corresponding to the sixth row of the second column) is obtained by referring to input A=Disallow and input B=Force shown in FIG. 5. This shows that "Force" representing "always select" and "Disallow" representing "never select" are the incompatible directions.

In this case, the present invention requires specifications of operation on collision in the following two ways: (1) Administrator specifies a result on collision in advance; (2) Item of the query control information 300 has specified priorities. If neither (1) nor (2) is not specified, the operation specified by system determines the result. A flow of this collision resolution processing will be described by way of FIG. 6.

Step 601 judges whether or not the administrator has specified the result on collision. If specified (YES), the processing proceeds to step 602. If not specified (NO) the processing proceeds to step 603.

Step 602 uses the specified result as a merged result, and ends the collision resolution processing.

Step 603 judges whether or not the item of the query control information 300 has the specified priorities. If it has (YES), the processing proceeds to step 604. If it does not have (NO), the processing proceeds to step 605.

Step 604 uses the direction 332 with a high priority in the item of the query control information 300 as a merged result, and ends the collision resolution processing.

In step 605, the system forcefully uses "Disallow" as a merged result, and ends the collision resolution processing.

Up to this point the flow of the collision resolution processing and the merge operation of optimization directions are described.

(f) Query Optimization Using Query Operation Direction

Query optimization processing using the query operation direction will be described by way of FIG. 7 and FIG. 8.

When creating an execution plan, it is necessary to create an effective plan for execution by considering many factors including method for scanning a table (retrieving a value from an index, retrieving a value from a table using an index, retrieving a value from a table using no index, etc.), join order (order of join when two or more tables are joined), join method (in the case of the first embodiment, distributed join method; in the case of the second embodiment, hash join, nest loop join, sort merge join, etc.), position of join (if everything is processed using one DBMS like the second embodiment, it is not necessary to consider this factor; however, in the case of parallel DBMSs, the position of join corresponds to consideration of which processor is used to execute join) and how to perform selection processing and projection processing after any given processing.

In the cost-based optimization, required cost for each processing (CPU time, the number of times of I/O, the amount of network communication, etc.) is calculated to sort out those factors. The execution plan is created using the calculated cost. In this case, one or more choices of execution plan (or a part of execution plan) are created, and the execution plan with the lowest cost is selected.

Cost is calculated using statistical information. For example, concerning Table A, the following statistical information is used: number of disk pages 50, number of records 100, minimum value 0, maximum value 100, distribution of values "30 record within the range from 0 to 50, 70 records within the range from 51 to 100", table attributes "sorted in ascending order", and the like. If a query gives a selection condition "Less than or equal to 20" for Table A, the number of records for the result of this selection processing is estimated at 30×20/50=12 records from the statistical information. As a result, the number of pages to be read from the disk is estimated at 50×12/100=6.

When creating a choice of execution plan, alternatives of operations that are effective and applicable to obtain the first query for one or more tables required to obtain the result of the first query are listed. In some cases, operations that are apparently disadvantageous for the purpose of cost are eliminated. Accordingly, the choices of execution plan are narrowed down.

In the query optimization using the query operation direction, listing of the alternatives of applicable operations is processed within the range specified by the query operation direction. If there is an alternative that is recommended ("Recommended" is specified) or forced ("Force" is specified) by the query operation direction, the direction is followed (except an unavoidable case). If there is an alternative that is unrecommended ("Deny" is specified) or prohibited ("Disallow" is specified) by the query operation direction, the direction is followed (except an unavoidable case).

This processing will be described for a case where selection of join processing is performed by way of FIG. 7 and FIG. 8. FIG. 7 is a pseudo program of join method determination processing, in which the query operation direction is not used. In line 2, the numbers of records of table X and Y are estimated based on the statistical information. The table on the larger side is called an outer table, and the table on the smaller side is called inner table. In line 3 and 4, the program judges whether or not an advantageous join method A is selected if the inner table data has one record. This program selects the join method A if an intermediate result of the inner table is unique. Next, in line 5 and 6, the program judges whether or not an advantageous join method B is selected if the amount of the inner table data is small. In line 7, the program judges whether the amounts (the number of bytes) of the inner table data and the outer table data are large or small. Depending on the results of judgment and also depending on whether the inner table is transferable to the outer table side, the program determines the join method C, D, or E.

On the other hand, FIG. 8 is a pseudo program of join method determination processing, in which the query operation direction is taken into account. In line 3, 5, 8, 10, and 13, usable ( ) and not usable ( ) functions are inserted. In line 16 to 18, processing of selecting join method E is inserted in case no join method is selected.

The usable (A, d, threshold value) function performs the following: (1) The usable function searches the query operation direction d, and judges whether there is a direction for the join method A; (2) If there is not such direction, the function returns "true"; (3) If there is such direction, the function examines the strength of the direction; (4) If the strength="Force", the function returns "true"; (5) If the strength="Recommended", the function calculates the cost for a case where the join method A is applied to the table X and Y. Then, if the cost is less than or equal to the threshold value, the function returns "true", and if the cost is greater than the threshold value, the function returns "false"; (6) In other cases the function returns "false".

The not usable (A, d, threshold value) function performs the following: (1) The usable function searches the join method 333 of the query operation direction d, and judges whether there is a direction for the join method A; (2) If there is not such direction, the function returns "false"; (3) If there is such direction, the function examines the strength of the direction; (4) If the strength="Disallow", the function returns "true"; (5) If the strength="Deny", the function calculates the cost for a case where the join method A is applied to the table X and Y. Then, if the cost is greater than the threshold value, the function returns "true", and if the cost is less than or equal to the threshold value, the function returns "false"; (6) In other cases the function returns "false".

Those functions provide the consideration of contents of the query operation direction and determination of join method. Determinations of join order, position of join, position of selection, position of subquery, position of grouping, position of sorting, and employment of replica, which use the join order 334, the position of join 335, the position of selection 336, the position of subquery 337, the position of grouping 338, the position of sorting 339, and the employment of replica 340 of the query operation direction, is similar to the determination of the join method described above. Therefore, description for each is omitted.

Up to this point the query optimization processing using the query operation direction is described.

(g) System Administration Using Query Classification Definition and Query Operation Direction A method for changing optimization operation of system administration using the query classification definition and the query operation direction will be described by way of FIGS. 9 and 10.

FIG. 9 is an example of inter-company network in which intranets of two companies are mutually used. Intranet 901 is the intranet of company X, and the intranet 902 is the intranet of company Y. 903 is a network that connects between the intranets of the company X and the company Y. In the intranet 901, application 120, data processing system 100, DBMS 107, and DBMS 107' operate. In the intranet 902, DBMS 107" and DBMS 107'" operate. The DBMS 107 is data warehouse of the company X, and the DBMS 107' is data mart of the company X. The DBMS 107" is data waremart of the company Y, and the DBMS 107'" is OLTP machine of the company Y. Because the DBMS 107'" is OLTP machine and is assigned to perform key operations of the company Y, there is a policy of system administration to prevent a load as much as possible.

The data processing system 100 receives a query issued by the application 120, obtains data that are required to create a result of the query by accessing the DBMS 107, 107', 107", and 107'", and then replies to the query. In this case, the data processing system 100 may perform a part or the whole of the access to the DBMS 107, 107', 107", and 107'" at high speed using a replica.

In FIG. 9, as a result of query optimization, the data processing system 100 has created the following execution plan: Making access to the DBMS 107 and 107' by policy 904 (that is, using the join method B with using the replica), making access to the DBMS 107" by policy 905 (that is, using the join method C with using the replica), and making access to the DBMS 107'" by policy 906 (that is, using the join method E without using the replica). This execution plan is the best from the viewpoint of the total cost. However, there are the following problems from the viewpoint of system administration: (1) Because join is executed using the join method E, the amount of data communicated between the DBMS 107'" and the data processing system 100 is large; (2) Because the replica is not used when the DBMS 107'" is accessed, a load is put on the DBMS 107'" to some extent.

Figure 10:
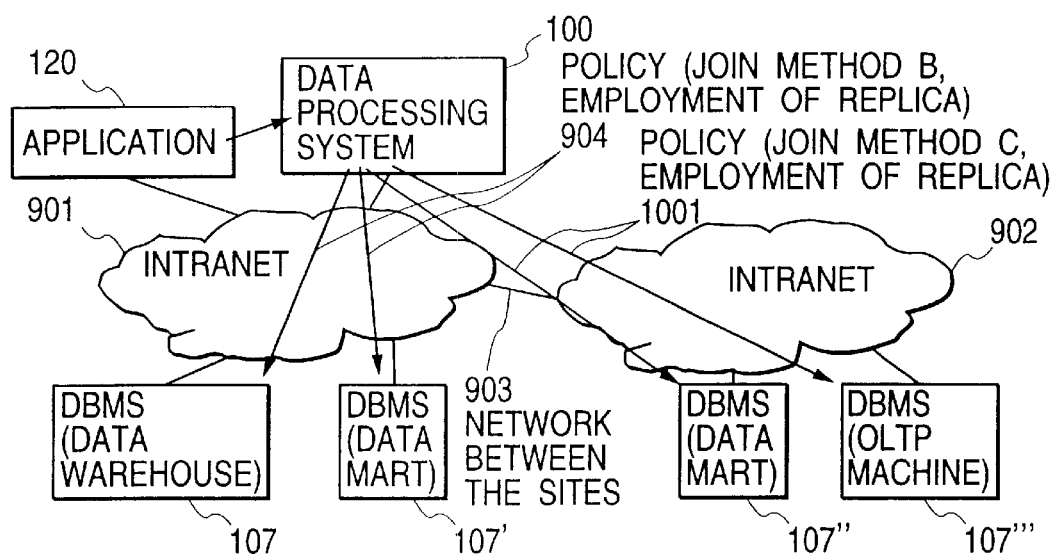
FIG. 10 is an explanatory drawing of optimization operation that uses a query classification definition and a query operation direction.

FIG. 10 shows an execution plan that uses the query classification definition 310 and the query operation direction 330 to address the problems in FIG. 9. More specifically, a query group including the access to the DBMS 107'" is defined by the query classification definition 310. Moreover, as the query operation direction, join method 333 is set to "Join method C—Recommended", and employment of replica 340 is set to "Employment of replica—Recommended". As a result, the query optimization operation is changed, and the execution plan that uses the join method C for the access to the DBMS 107'" and that uses the replica (policy 1001) is selected.

Up to this point the modification of query optimization operation using the query classification definition and the query operation direction is described.

Next, a method for changing query execution operation using the query classification definition and the query operation direction will be described by way of FIGS. 11 and 12.

Figure 11:
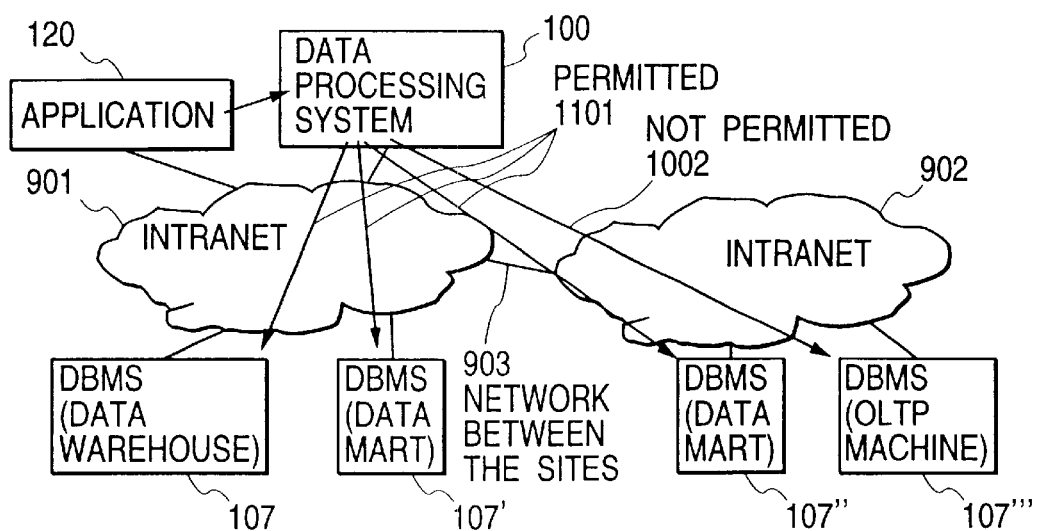
FIG. 11 is an explanatory drawing of query execution operation that does not use a query classification definition and a query operation direction.

Although FIGS. 11 and 12 show the similar configuration to that of FIG. 9, they are based on the assumption that the following constraints of system operation are applied: (1) During night batch processing, a load to the DBMS 107'" should be prevented; (2) If a load to network between the sites 903 increases due to reconstruction processing of the DBMS 107 at the end of the month, capacity of the network between the sites 903 should be concentrated on the reconstruction processing of the DBMS 107.

An example of the query classification definition for realizing the constraint (1) is "Name of access target DB server 316=107'''", Range of time 327=Night". An example of the query operation direction for realizing the constraint (1) is "Time to the halt of execution 341=0 second" showing "not permitted". As a result, as shown in FIG. 11, for a query issued by application 120 at night, query operation in which accesses to the DBMS 107, 107', and 107'' are permitted (1101) and in which access to the DBMS 107''' is not permitted (1102) can be realized.

An example of the query classification definition for realizing the constraint (2) is "Name of access target network 318=903, Range of time 327=End of month". An example of the query operation direction for realizing the constraint (2) is "Time to the halt of execution 341=0 second". As a result, as shown in FIG. 12, for a query issued by the application 120 at the end of the month, query operation in which accesses to the DBMS 107 and 107' are permitted (1201) and in which accesses to the DBMS 107'' and 107''' are not permitted (1202) can be realized.

Up to this point the modification of query execution operation using the query classification definition and the query operation direction is described.

(h) Presentation of Insufficient Information in Query Optimization

Presentation of insufficient information during query optimization and presentation processing of used query operation directions will be described by way of FIG. 13.

In the cost-based optimization, an execution plan is created using many pieces of statistical information. In this process, if necessary statistical information does not exist, cost cannot be estimated. The execution plan, therefore, is inevitably created based on more conservative judgment. This means that existence of necessary statistical information is a key to succeed in the cost-based optimization.

For example, in the processing of determining a join method for joining Table A with Table B, if information showing that the size of the Table A is smaller than that of the Table B and that the size of main memory is enough to store the Table A is found, hash join in which the Table A is an inner table can be executed at high speed. For this judgment, three kinds of information, that is, "size of Table A", "size of Table B", and "Available size of main memory at execution" are required. If the hash join is selected when one of them is insufficient, a large number of disk input/output operations may be required. Therefore, it is thought that selecting sort merge join of which performance is stable at worst time is safer although the performance is worse than the hash join. For many of the cost-based optimization, safer method will be selected to reduce the worst time of processing in such situation. This is the situation in which the cost-based optimization is forced to use more conservative operation because of insufficient statistical information.

For this reason, in the present invention, insufficient statistical information that is necessary in the process of the cost-based optimization is identified, and then feedback is sent to a user and a system administrator. FIG. 13 is a pseudo program for join method determination processing including codes for recording operation of the cost-based optimization.

In line 5, 8, 12, 15, 19, and 23, a log ( ) function, which records where join method has been selected, is inserted. For example, the log in line 5 shows "Processing: Determination of join method, Query operation direction d, Program position: Status 1301, Result of processing: Join method A".

This log is sent from the query optimizer 112 to the optimization controller 114 (165), and is stored in the secondary storage 115 as necessary (168).

In addition, as another method for obtaining a log, the following method can also be applied: the statistical information, the query classification definition, the query operation direction, and dictionary information (table definition, etc.) are output as the log for each change; and log output when a query is issued is limited to a character string of the query. Other methods can also be applied if sufficient information is obtained to replicate the process of the optimization processing.

After receiving a log analysis request from application 121, the optimization controller 114 retrieves the log stored in the secondary storage 115 (169) and analyzes it. Referring to the previous example, judging from the log of "Processing: Determination of join method, Program position: Status 1301, Query operation direction: d, Result of processing: Join method A", the optimization controller 114 knows that the join method has been determined with the status 1301, checks whether or not statistical information "Intermediate result of inner table is unique" associated with the status exists, and then outputs "Intermediate result of inner table is unique: Exist" to the management application 121 (through 170 and 157).

A relation table showing associated relations between status 1301–1305 and the statistical information associated with the statuses are created in advance. In addition, as another method, the associated relations between the statuses and the statistical information may also be obtained by replicating the optimization processing with tracing it.

In another example, when analyzing a log of "Processing: Determination of join method, Program position: Status 1302, Query operation direction: d, Result of processing: Join method B", it is known that the join method has been determined with the status 1302, and whether or not statistical information "Intermediate result of inner table is unique and Number of record (inner table) is small" associated with the status exists is checked (not to judge whether the conditions are true or false, but to check whether or not enough information to judge the conditions exists). In this case, it should be noted that statistical information associated with the status 1302 includes not only statistical information intended for use in if-clause (line 6) immediately before the log but also statistical information intended for use in other if-clauses (line 3) that have been evaluated to reach line 8.

As a result of checking, if both of the statistical information exist, "Intermediate result of inner table is unique: Existent, Number of records (inner table) small: Existent" is output to the management application 121. If statistical information about "Intermediate result of inner table is unique" does not exist, "Intermediate result of inner table is unique: Inexistent, Number of records (inner table) small: Existent" is output to the management application 121. "Intermediate result of inner table is unique" is the insufficient statistical information that is necessary in the process of the cost-based optimization. Therefore, when the statistical information does not exist, obtaining the statistical information about "Intermediate result of inner table is unique" by the user and the administrator may result in selection of (more effective) join method A in the next determination of join method.

Used query operation directions as well as the insufficient statistical information can also be identified from the log above described. For example, judging from the log of "Processing: Determination of join method, Program position: Status 1301, Query operation direction: d, Result of processing: Join method A", it is known that the join method has been determined with the status 1301, and then the query operation direction associated with the status "Not usable (A, d, threshold value) or Usable (A, d, threshold value)" is obtained. Moreover, by performing the processing equivalent to "Not usable (A, d, threshold value) or Usable (A, d, threshold value)" again, whether or not join method has been determined with the effectiveness of d is checked. For example, if "Join method A: Recommended" of d had the effectiveness, the optimization controller 114 accordingly outputs "Join method A: Recommended" to the management application 121 along with the query classification definition associated with the query operation direction.

A relation table showing associated relations between status 1301–1305 and the query operation directions corresponding to the statuses are created in advance. In addition, as another method, the associated relations between the status and the statistical information may also be obtained by replicating the optimization processing with tracing it.

Up to this point the presentation of insufficient information during query optimization and the presentation processing of used query operation directions are described.

(i) Presentation of Recommended Values of Query Classification Definition and Query Operation Direction A basic concept of representing recommended values of the query classification definition and the query operation direction is the following: when the first query is optimized by the cost-based optimization, points to which conservative operation is applied are extracted; the query classification definition and the query operation direction that are needed to avoid the conservative operation are represented as the recommended values. If the user and the administrator provide the values based on those recommended ones, better execution plan will be obtained when the first query is optimized again.

As a matter of course, not all values can be presented as recommended values (If there is a value that can be presented, it could have been used when the first query is optimized for the first time). In short, so-called recommended values are partially the determined values, but partially include undetermined values.

Figure 14:
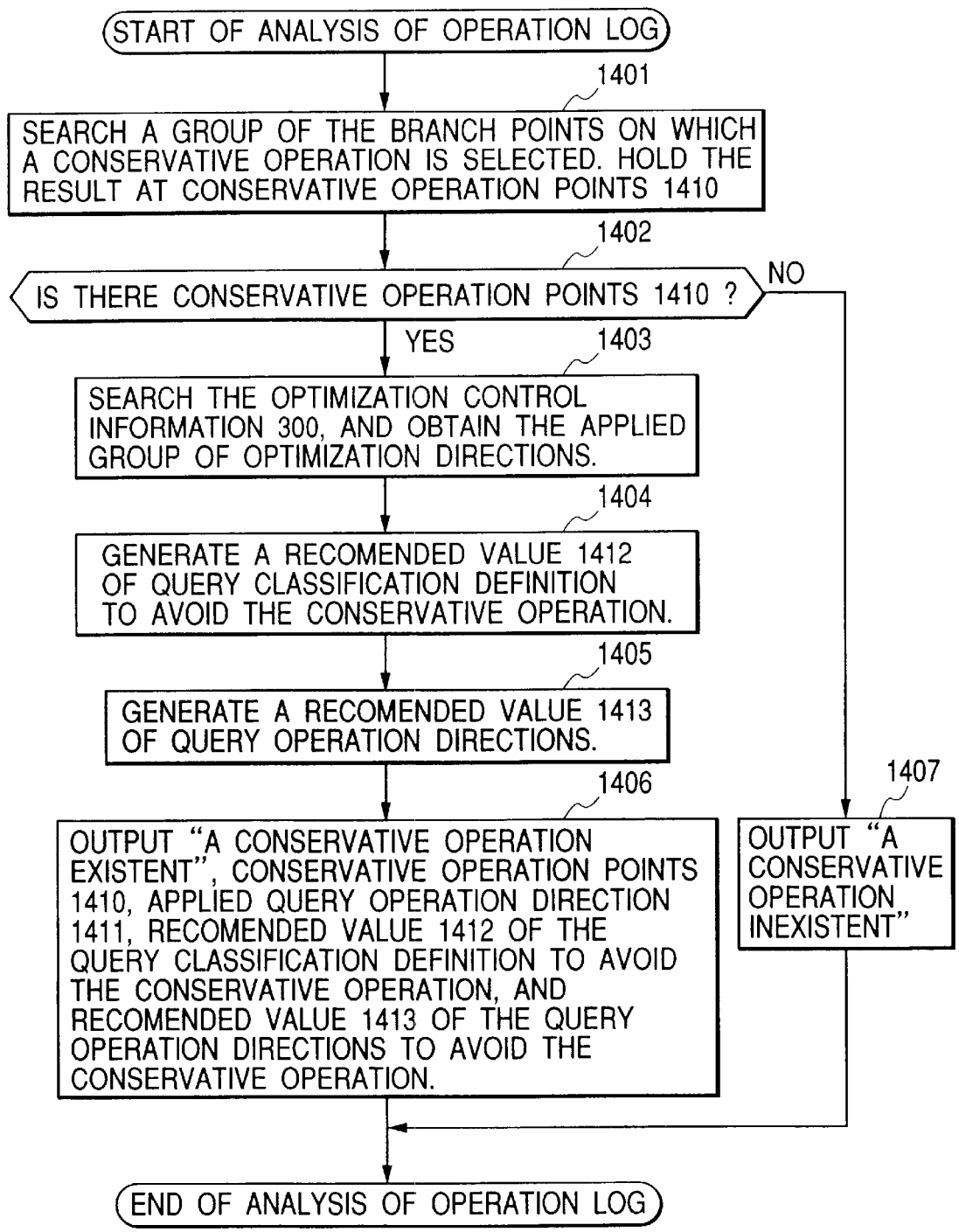
FIG. 14 is a flowchart of operation log analysis processing.

Procedures for presentation processing of the recommended values of the query classification definition and the query operation direction will be described by way of FIG. 14.

Step 1401 searches one or more points, to which conservative operation is applied, from a log taken in the process of optimization processing. (The log may be the one that is obtained by optimization logic of join methods with the log above described. In addition, the following method can also be applied: the statistical information, the query classification definition, the query operation direction, and the dictionary information (table definition, etc.) are output as the log for each change; and log output when a query is issued is limited to a character string of the query. Other methods can also be applied if enough information is obtained to replicate the process of the optimization processing.) The results are stored in conservative operation points 1410.

The conservative operation is performed at a point where the statistical information is insufficient in the process of optimization in optimization processing. Therefore, using a similar method to the above-described "Presentation of insufficient information in query optimization", points at which statistical information is insufficient at the time of optimization are identified and recorded.

Step 1402 judges whether or not there are one or more than one conservative operation points 1410. If exist (YES), the processing proceeds to step 1403. If not (NO), it proceeds to step 1407.

In step 1403, using similar processing to the above-described "Presentation of used query operation directions", one or more query optimization directions 1411 that have been applied in the optimization of the first query are obtained. The used query operation directions are obtained for the user and the administrator to check query operation directions, which have already been applied, before specifying recommended values.

Step 1404 generates recommended value 1412 of the query classification definition to avoid the conservative operation. Because the first query has already been analyzed before optimization processing, query optimizer 112 has application name 313, application type 314, user organization 315, name of access target DB server 316, type of access target DB server 317, name of access target network 318, type of access target network 319, access target table 320, access target column 321, access target column attribute 322, data size of the result 323, data size of the intermediate result 324, number of records of the result 325, and number of records of the intermediate result 326 during the optimization processing. A query classification definition 310 with those values set is created, in which 'null' is set to range of time 327 as an unknown item. This results in the recommended value 1412 of the query classification definition for optimization direction to avoid one point of conservative operation. This operation is performed for each of the conservative operation points 1410 obtained in step 1401.

Step 1405 generates recommended value 1413 of the query operation direction to avoid the conservative operation. Using a similar method to the above-described "Presentation of insufficient information in query optimization", insufficient information that is the reason why conservative operation is performed at conservative operation point is identified. Using the insufficient information, the recommended value 1413 of the query operation direction is generated. For example, suppose that the insufficient information has been "size of Table A" for determining a join method of Table A and Table B, and that the threshold value to be compared has been X. In this case, "Size of Table A<=X or Size of Table A>=X" is output as the recommended value 1413 of the query operation direction. The administrator or the user checks this recommended value. If either "Size of Table A<=X" or "Size of Table A>=X" can be selected, the administrator or the user can add the new query operation direction "Size of Table A<=X" (or "Size of Table A>=X").

Step 1406 outputs the following as a result of the history analysis: "A conservative operation existent", conservative operation points 1410, applied query operation direction 1411, recommended value 1412 of the query classification definition to avoid the conservative operation, recommended value 1413 of the query operation directions to avoid the conservative operation.

Step 1407 outputs the following as a result of the history analysis: "A conservative operation inexistent".

Up to this point the presentation of the recommended values of the query classification definition and the query operation direction are described. As described above, if the recommended values of the query classification definition and the query operation direction are provided, the administrator and the user can know an effective direction with high accuracy to avoid the conservative operation, and can also perform the query operation direction easily with few mistakes.

(1) The query classification definition 310 and the query operation direction 330 enable the administrator to control the operations of the database hub and the DBMS in a batch without modifying the applications.

(2) Specifying join method and others of the query operation direction 330 provides control over query optimization based not only on a request for performance inside the DBMS but also on a request from system administration.

(3) Specifying number of records in the table 344 and others of the query operation direction 330 enables specification of statistical information, which should be used in a specific situation, as necessary from outside the database hub and the DBMS.

(4) Specifying time to the halt of execution 341 and others of the query operation direction 330 provides control over query execution based on a request from system administration.

(5) Supporting to create specification regarding the operation at the time of query optimization and query execution enables easy specification, with few mistakes, regarding the operation at the time of query optimization and query execution.

The five effects of the present invention as described above enable the database hub and the DBMSs to operate at high speed as a whole system, and at the same time according to the administrator's intention, even on the occasion of integration of information infrastructures to integrate two or more DBMSs in a company and among companies.

What is claimed is:

1. A method for processing a query in a system including a computer or two or more computers connected with a network wherein:

a first program comprising a data processing system, one or more second programs application programs comprising, and one or more third programs comprising database management systems operate on said computer or said two or more computers;

the third programs hold one or more databases each including one or more tables each having one or more column and one or more records;

the first program receives a first query to be processed from one of the second program; and the first program obtains a result of the first query using data that is stored in said databases and that has been obtained by the third programs;

said method executed by said first program comprising the steps of:

receiving information for classifying queries into query groups which include a plurality of query classification definitions, each specifying one or more query attributes applicable to queries to be belonging to the corresponding query group, and storing the definition information in a storage;

receiving information of query operation directions each being designated to each of said query groups respectively defined by said query classification definitions and each showing how to process the queries belonging to the corresponding query group, and storing said query operation directions in the storage;

searching for one or more query group definitions that match the received first query among the query group definitions stored in the storage by comparing query attributes of the first query with query attributes specified in each of said query group definitions (query matching processing); and obtaining a result of the first query by processing the first query in accordance with the query operation directions designated to the resulting query classification definitions.

2. A method for processing a query as claimed in claim 1, wherein said query attributes specified in one of the query classification definitions include names of one or more target tables or target columns for the queries to be belonging to the corresponding query group; and said query matching processing includes a step of judging whether names of target tables or target columns designated by the received first query as access targets thereof match the names of target tables or target columns specified in said one of the classification definitions.

3. A method for processing a query as claimed in claim 1, wherein said query attributes specified in one of the query classification definitions include at least one of:

name of a third program for processing the queries to be belonging to the corresponding query group, name or type of a computer where the third program processing the queries to be belonging to the corresponding query group operates, name or type of a network between the computer where the third program for processing the queries to be belonging to the corresponding query group operates and a computer where said first program operates, and said query matching processing includes a step of judging whether all of the query attributes specified in said one of the query classification definitions are applicable to the received first query.

4. A method for processing a query as claimed in claim 1, wherein said query attributes specified in one of the query group definitions include one or more types of second programs that issue the queries to the computer where the third program for processing the queries to be belonging to the corresponding query group and, said query matching processing includes a step of judging whether a type of a second program that issues the received first query matches one of the types of second programs specified in said one of the query classification definitions.

5. A method for processing a query as claimed in claim 1, wherein said query attributes specified in one of the query group definitions include one or more pairs of type of the third program required to process the queries to be belonging to the corresponding query group and amount of data to be obtained from the third program when processing one of said queries, and said query matching processing includes a step of judging whether a pair of type of the third program required to process the received first query and estimated amount of data to be obtained from the third program when processing the first query matches one of said pairs specified in said one of the query classification definitions.

6. A method for processing a query as claimed in claim 1, wherein said query attributes specified in one of the query group definitions include one or more pairs of type of the third program required to process the queries to be belonging to the corresponding query group and number of records to be obtained from the third program when processing one of said queries, and said query matching processing includes a step of judging whether a pair of type of the third program required to process the received first query estimated number of records to be obtained from the third program when processing the first query matches one of said pairs specified in said one of the query classification definitions.

7. A method for processing a query as claimed in claim 1, wherein said query attributes specified in one of the query group definitions include one or more pairs of type of the third program required to process the queries to be belonging to the corresponding query group and range of time during which said queries are issued, and said query matching processing includes a step of judging whether a pair of type of the third program required to process the received first query time at which the first query has been issued matches one of said pairs specified in said one of the query classification definitions.

8. A method for processing a query as claimed in claim 1, wherein said query classification definition has one or more ranges of time, and said query matching processing is a processing to classify the first query into the query groups according to judgment about whether time at which the first query has been issued is within the range of time specified in the first pair.

9. A method for processing a query as claimed in claim 1, wherein said query attributes specified in one of the query group definitions include type of organization to which users issuing queries to be belonging to the corresponding query group belong, and said query matching processing includes a step of judging whether type of organization to which a user who has issued the received first query belongs matches to the type of organization specified in said one of the query classification definitions.

10. A method for processing a query as claimed in claim 1, wherein said query classification definition is a matching program of the query pattern taking the place of said query pattern, and said query matching processing is an execution of the matching program.

11. A method for processing a query in a system including a computer or two or more computers connected with a network wherein:

a first program (data processing system), one or more second programs (application programs), and one or more third programs (database management systems) operate on said computer or said two or more computers;

the third programs hold one or more databases each including one or more tables each having one or more columns and one or more records;

the first program receives a first query to be processed from one of the second programs; and the first program obtains a result of the first query using data that is stored in said databases and that has been obtained by the third programs;

said method executed by said first program comprising the steps of:

receiving information for classifying queries into query groups which include a plurality of query classification definitions, each specifying one or more query attributes applicable to queries to be belonging to the corresponding query group, and storing the definition information in a storage;

receiving information of query optimization operation directions, each being designated to each of said query groups respectively defined by said query classification definitions and each showing how to optimize processing of the queries belonging to the corresponding query group, and storing said query operation directions in the storage;

searching for one or more query group definitions that match the received first query among the query group definitions stored in the storage by comparing query attributes of the first query with query attributes specified in each of said query group definitions (query matching processing); and optimizing the first query in accordance with said query optimization operation directions corresponding to the resulting query classification definitions before obtaining the result of the first query from the third programs.

12. A method for processing a query as claimed in claim 11, wherein said query classification definition classifies said first query into one or more query groups using one or more from the following:

one or more tables required to obtain a result of the query, one or more column required to obtain a result of the query, names of one or more third programs required to obtain a result of the query, name of the computer where one or more third programs required to obtain a result of the query operate, type of the computer where one or more third programs required to obtain a result of the query operate, type of the network between the computer where one or more third programs required to obtain a result of the query operate and a computer where the first program operates, type of the first program that has issued the query, type of organization of the first program that has issued the query, estimated amount of data obtained from the third program when obtaining a result of the query, estimated number of records obtained from the third programs when obtaining a result of the query, and time at which the query has been issued.

13. A method for processing a query as claimed in claim 11, wherein concerning one or more join processing described in said first query, said query optimization direction specifies one or more from the following:

join order, join method, a computer that executes the join processing, and the third program that executes the join processing.

14. A method for processing a query as claimed in claim 11, wherein
concerning record selection processing described in said first query, one or more are specified from the following:
a computer that executes the record selection processing, the third program that executes the record selection processing, and a record selection target column.

15. A method for processing a query as claimed in claim 11, wherein
concerning record grouping processing described in said first query, one or more are specified from the following:
a computer that executes the grouping processing, the third program that executes the grouping processing, and a condition of the grouping processing.

16. A method for processing a query as claimed in claim 11, wherein
concerning record sort processing described in said first query, one or more are specified from the following:
a computer that executes the sort processing, the third program that executes the sort processing, and a condition of the sort processing.

17. A method for processing a query as claimed in claim 11, wherein
concerning record subquery processing described in said first query, one or more are specified from the following:
a computer that executes the subquery processing, the third program that executes the subquery processing, and a condition of the subquery processing.

18. A method for processing a query as claimed in claim 11, wherein
concerning the record subquery processing described in said first query, one or more are specified from the following:
whether or not optimization using a replica is performed, and the replica that is used for optimization.

19. A method for processing a query in a system including a computer or two or more computers connected with a network wherein:
a first program (data processing system), one or more second programs (application programs), and one or more third programs (database management systems) operate on said computer or said two or more computers;
the third programs hold one or more databases each including one or more tables each having one or more column and one or more records;
the first program receives a first query to be processed from one of the second programs; and
the first program obtains a result of the first query using data that is stored in said databases and that has been obtained by the third programs;
said method executed by said first program comprising the steps of:
receiving information for classifying queries into query groups which include a plurality of query classification definitions, each specifying one or more query attributes applicable to queries to be belonging to the corresponding query group, and storing the definition information in a storage;
receiving information of statistical information directions, each being designated to each of said query groups respectively defined by said query classification definitions and each showing how to process the queries belonging to the corresponding query group based on statistical information about tables or columns, and storing said query operation directions in the storage;
searching for one or more query group definitions that match the received first query among the query group definitions stored in the storage by comparing query attributes of the first query with query attributes specified in each of said query group definitions (query matching processing); and
optimizing the first query in accordance with said statistical information directions corresponding to the resulting query classification definitions before obtaining the result of the first query from the third programs.

20. A method for processing a query as claimed in claim 19, wherein
said query classification definition classifies said first query into one or more query groups using one or more from the following:
one or more tables required to obtain a result of the query,
one or more columns required to obtain a result of the query,
names of one or more third programs required to obtain a result of the query,
name of the computer where one or more third programs required to obtain a result of the query operate,
type of the computer where one or more third programs required to obtain a result of the query operate,
type of the network between the computer where one or more third programs required to obtain a result of the query operate and the computer where the first program operates,
type of the first program that has issued the query,
type of organization to which a user who has issued the query belongs,
estimated amount of data obtained from the third programs when obtaining a result of the query,
estimated number of records obtained from the third programs when obtaining a result of the query, and
time at which the query has been issued.

21. A method for processing a query as claimed in claim 19, wherein
concerning one or more tables or columns required to obtain a result of the query, said statistical information direction is any of the following:
number of records for the result of the selection processing,
number of records for the result of the join processing,
the maximum value of data stored in each of the columns,
the minimum value of data stored in each of the columns, and
number of unique values of data stored in each of the columns.

22. A method for processing a query as claimed in claim 19, wherein:
the step of said optimizing further outputs the statistical information that has been intended for use but has not exist when said query has been optimized.

23. A method for processing a query in a system including a computer or two or more computers connected with a network wherein:

a first program (data processing system), one or more second programs (application programs), and one or more third programs (database management systems) operate on said computer or said two or more computers;

the third programs hold one or more databases each including one or more tables each having one or more columns and one or more records;

the first program receives a first query to be processed from one of the second programs; and the first program obtains a result of the first query using data that is stored in said databases and that has been obtained by the third programs;

said method executed by said first program comprising the steps of:

receiving information for classifying queries into query groups which include a plurality of query classification definitions, each specifying one or more query attributes applicable to queries to be belonging to the corresponding query group, and storing the definition information in a storage;

receiving information of query operation directions, each being designated to each of said query groups respectively defined by said query classification definitions and each showing how to process the queries belonging to the corresponding query group, and storing said query operation directions in the storage;

searching for one or more query group definitions that match the received first query among the query group definitions stored in the storage by comparing query attributes of the first query with query attributes specified in each of said query group definitions (query matching processing);

optimizing the first query in accordance with said query operation directions corresponding to the resulting query classification definitions before obtaining the result of the first query from the third programs; and outputting one or more query classification definitions and query operation directions that have been used to optimize said first query.

24. A method for processing a query in a system including a computer or two or more computers connected with a network wherein:

a first program (data processing system), one or more second programs (application programs), and one or more third programs (database management systems) operate on said computer or said two or more computers;

the third programs hold one or more databases each including one or more tables each having one or more columns and one or more records;

the first program receives a first query to be processed from one of the second programs; and the first program obtains a result of the first query using data that is stored in said databases and that has been obtained by the third program;

said method executed by said first program comprising the steps of:

receiving information for classifying queries into query groups which include a plurality of first query classification definitions, each specifying one or more query attributes applicable to the first queries to be belonging to the corresponding query group, and storing the definition information in a storage;

receiving information of first operation directions (directions regarding query optimization, directions regarding query execution, or statistical information about tables or columns), each being designated to each of said query groups respectively defined by said first query classification definitions and each showing how to process the first query belonging to the corresponding query group, and storing said query operation directions in the storage;

searching for one or more query group definitions that match the received first query among the query group definitions stored in the storage by comparing query attributes of the first query with query attributes specified in each of said query group definitions (first query matching processing); and optimizing the first query in accordance with said first operation directions corresponding to the resulting query classification definitions before obtaining the result of the first query from the third programs; and outputting recommended values of an optimization classification definition or the first operation direction, which have been intended for use but have not exist when the first query has been optimized.

* * * * *